US012619604B2

(12) United States Patent
Lester et al.

(10) Patent No.: US 12,619,604 B2
(45) Date of Patent: May 5, 2026

(54) PROMPT TUNING USING ONE OR MORE MACHINE-LEARNED MODELS

(71) Applicant: Google LLC, Mountain View, CA (US)

(72) Inventors: Brian David Lester, Mountain View, CA (US); Rami Eid Sammour Al-Rfou, Mountain View, CA (US); Noah Jg Constant, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 162 days.

(21) Appl. No.: 18/684,518

(22) PCT Filed: Aug. 20, 2021

(86) PCT No.: PCT/US2021/046849
§ 371 (c)(1),
(2) Date: Feb. 16, 2024

(87) PCT Pub. No.: WO2023/022727
PCT Pub. Date: Feb. 23, 2023

(65) Prior Publication Data
US 2024/0378196 A1 Nov. 14, 2024

(51) Int. Cl.
*G06F 16/242* (2019.01)

(52) U.S. Cl.
CPC ................................. *G06F 16/243* (2019.01)

(58) Field of Classification Search
CPC ...... G06F 16/243; G06N 20/00; G06N 3/091; G06N 3/096
See application file for complete search history.

(56) References Cited

U.S. PATENT DOCUMENTS

2023/0237277 A1* 7/2023 Reza ..................... G06F 40/186
704/9

FOREIGN PATENT DOCUMENTS

EP 3477557 A1 5/2019

OTHER PUBLICATIONS

International Preliminary Report on Patentability for Application No. PCT/US2021/046849, mailed Feb. 29, 2024, 12 pages.
Bar-Haim et al., "The Second PASCAL Recognising Textual Entailment Challenge", Proceedings of the Second PASCAL Challenges Workshop on Recognising Textual Entailment, vol. 6, Venice, 9 pages.
Bentivogli et al., "The Fifth PASCAL Recognizing Textual Entailment Challenge", Second Text Analysis Conference, Gaithersburg, Maryland, United States, Nov. 16-17, 2009, 15 pages.

(Continued)

*Primary Examiner* — Mahelet Shiberou
(74) *Attorney, Agent, or Firm* — DORITY & MANNING, P.A.

(57) ABSTRACT

Systems and methods for prompt tuning can leverage semantic searching for determining similar prompts to use for retraining. A prompt can be generated then searched to find the similar prompts. Data related to the similar prompts can then be utilized for prompt tuning. Moreover, systems and methods for prompt tuning can generate and utilize a meta-prompt to reduce the computational cost of generating prompts. The prompt tuning techniques can be implemented as part of a prompt tuning application programming interface (API).

17 Claims, 21 Drawing Sheets

(56) References Cited

OTHER PUBLICATIONS

Brown et al., "Language Models are Few-Shot Learners", arXiv:2005.14165v4, Jul. 22, 2020, 75 pages.

Clark et al., "BoolQ: Exploring the Surprising Difficulty of Natural Yes/No. Questions", arXiv:1905.10044v1, May 24, 2019, 13 pages.

Dagan et al., "The PASCAL Recognising Textual Entailment Challenge", First International Conference on Machine Learning Challenges: Evaluating Predictive Uncertainty Visual Object Classification, and Recognizing Textual Entailment, Southampton, United Kingdom, Apr. 11-13, 2005, 10 pages.

De Marneff et al., "The CommitmentBank: Investigating Projection in Naturally Occurring Discourse", Proceedings of Sinn und Bedeutung 23, vol. 2, Jul. 25, 2019, 18 pages.

Devlin et al., "BERT: Pre-Training of Deep Bidirectional Transformers for Language Understanding", arXiv:1810.04805v2, May 24, 2019, 16 pages.

Dolan et al., "Automatically Constructing a Corpus of Sentential Paraphrases", Third International Workshop on Paraphrasing (IWP2005), Jeju Island, South Korea, Oct. 2005, 8 pages.

Dua et al., "DROP: A Reading Comprehension Benchmark Requiring Discrete Reasoning Over Paragraphs", arXiv:1903.00161v2, Apr. 16, 2019, 12 pages.

Fisch et al., "MRQA 2019 Shared Task: Evaluating Generalization in Reading Comprehension", arXiv:1910.09753v2, Dec. 20, 2019, 13 pages.

Giampiccolo et al., "The Third PASCAL Recognizing Textual Entailment Challenge", ACL-PASCAL Workshop on Textual Entailment and Paraphrasing, Prague, Czech Republic, Jun. 28-29, 2007, 9 pages.

GitHub, "Flax: A Neural Network Library and Ecosystem for JAX", 2023, http://github.com/google/flax, retrieved on Jun. 9, 2024, 6 pages.

GitHub, "JAX: Composable Transformations of Python+NumPy Programs", 2018, http://github.com/google/jax, retrieved on Jun. 9, 2024, 7 pages.

Hambardzumyan et al., "WARP: Word-level Adversarial ReProgramming", arXiv:2101.00121v2, Jun. 2, 2021, 13 pages.

Hansen et al., "Neural Network Ensembles", Institute of Electrical and Electronics Engineers Transactions on Pattern Analysis and Machine Intelligence, vol. 12, Issue 10, Oct. 1990, 9 pages.

Houlsby et al., "Parameter-Efficient Transfer Learning for NLP", arXiv:1902.00751v2, Jun. 13, 2019, 13 pages.

Howard et al., "Universal Language Model Fine-Tuning for Text Classification", arXiv:1801.06146v5, May 23, 2018, 12 pages.

Jiang et al., "How Can We Know What Language Models Know?", arXiv:1911.12543v2, May 3, 2020, 15 pages.

Kembhavi et al., "Are You Smarter Than a Sixth Grader? Textbook Question Answering for Multimodal Machine Comprehension", 2017 Institute of Electrical and Electronics Engineers Conference on Computer Vision and Pattern Recognition (CVPR), Honolulu, Hawaii, United States, Jul. 21-26, 2017, 9 pages.

Khashabi et al., "Looking Beyond the Surface: A Challenge Set for Reading Comprehension Over Multiple Sentences", 2018 Conference of the North American Chapter of the Association for Computational Linguistics: Human Language Technologies, New Orleans, Louisiana, United States, Jun. 1-6, 2018, 11 pages.

Kocijan et al., "A Surprisingly Robust Trick for the Winograd Schema Challenge", arXiv:1905.06290v2, Aug. 4, 2019, 6 pages.

Kudo et al., "SentencePiece: A Simple and Language Independent Subword Tokenizer and Detokenizer for Neural Text Processing", arXiv:1808.06226v1, Aug. 19, 2018, 6 pages.

Lai et al., "RACE: Large-scale Reading Comprehension Dataset from Examinations", arXiv:1704.04683v5, Dec. 5, 2017, 11 pages.

Lakshminarayanan et al., "Simple and Scalable Predictive Uncertainty Estimation Using Deep Ensembles", arXiv:1612.01474v3, Nov. 4, 2017, 15 pages.

Levesque et al., "The Winograd Schema Challenge", Thirteenth International Conference on the Principles of Knowledge Representation and Reasoning, Rome, Italy, Jun. 10-14, 2012, 10 pages.

Levy et al., "Zero-Shot Relation Extraction via Reading Comprehension", arXiv:1706.04115v1, Jun. 13, 2017, 10 pages.

Lewis et al., "BART: Denoising Sequence-To-Sequence Pretraining for Natural Language Generation, Translation, And Comprehension", arXiv:1910.13461v1, Oct. 29, 2019, 10 pages.

Li et al., "Prefix-Tuning: Optimizing Continuous Prompts for Generation", arXiv:2101.00190v1, Jan. 1, 2021, 15 pages.

Liu et al., "GPT Understands, Too", arXiv:2103.10385v2, Oct. 25, 2023, 10 pages.

Logeswaran et al., "Few-Shot Sequence Learning with Transformers", arXiv:2012.09543v1, Dec. 17, 2020, 13 pages.

Nair et al., "Rectified Linear Units Improve Restricted Boltzmann Machines", Twenty-Seventh International Conference on International Conference on Machine Learning, Haifa, Israel, Jun. 21-24, 2010, 8 pages.

Peters et al., "Deep Contextualized Word Representations", arXiv:1802.05365v2, Mar. 22, 2018, 15 pages.

Pfeiffer et al., "MAD-X: An Adapter-Based Framework for Multi-Task Cross-Lingual Transfer", arXiv:2005.00052v3, Oct. 6, 2020, 20 pages.

Pilehvar et al., "WiC: 10,000 Example Pairs for Evaluating Context-Sensitive Representations", arXiv:1808.09121v3, Apr. 27, 2019, 7 pages.

Qin et al., "Learning How to Ask: Querying LMs With Mixtures of Soft Prompts", arXiv:2104.06599v1, Apr. 14, 2021, 11 pages.

Quora, "First Quora Dataset Release: Question Pairs", 2017, https://quoradata.quora.com/First-Quora-Dataset-Release-Question-Pairs, retrieved on Nov. 21, 2025, 3 pages.

Radford et al., "Improving Language Understanding by Generative Pre-Training", Open AI, Jun. 11, 2018, 12 pages.

Radford et al., "Language Models are Unsupervised Multitask Learners", Open AI, Feb. 14, 2019, 24 pages.

Raffel et al., "Exploring the Limits of Transfer Learning with a Unified Text-to-Text Transformer", arXiv:1910.10683v4, Sep. 19, 2023, 67 pages.

Rajpurkar et al., "SQuAD: 100,000+ Questions for Machine Comprehension of Text", arXiv:1606.05250v3, Oct. 11, 2016, 10 pages.

Rebuffi et al., "Learning Multiple Visual Domains with Residual Adapters", arXiv:1705.08045v5, Nov. 27, 2017, 12 pages.

Roemmele et al., "Choice of Plausible Alternatives: An Evaluation of Commonsense Causal Reasoning", 2011 Association for the Advancement of Artificial Intelligence Spring Symposium Series, Palo Alto, California, United States, Mar. 21-23, 2011, 6 pages.

Saha et al., "DuoRC: Towards Complex Language Understanding with Paraphrased Reading Comprehension", arXiv:1804.07927v4, Oct. 10, 2018, 16 pages.

Schick et al., "Exploiting Cloze-Questions for Few-Shot Text Classification and Natural Language Inference", arXiv:2001.07676v3, Jan. 25, 2021, 15 pages.

Shazeer et al., "Adafactor: Adaptive Learning Rates with Sublinear Memory Cost", arXiv:1804.04235v1, Apr. 11, 2018, 9 pages.

Shazeer, "GLU Variants Improve Transformer", arXiv:2002.05202v1, Feb. 12, 2020, 5 pages.

Shin et al., "AutoPrompt: Eliciting Knowledge from Language Models with Automatically Generated Prompts", arXiv:2010.15980v2, Nov. 7, 2020, 15 pages.

Vaswani et al., "Attention Is All You Need", arXiv:1706.03762v7, Aug. 2, 2023, 15 pages.

Wang et al., "GLUE: A Multi-Task Benchmark and Analysis Platform for Natural Language Understanding", arXiv:1804.07461v3, Feb. 22, 2019, 20 pages.

Wang et al., "SuperGLUE: A Stickier Benchmark for General-Purpose Language Understanding Systems", arXiv:1905.00537v3, Feb. 13, 2020, 29 pages.

Waskom, "Seaborn: Statistical Data Visualization", Journal of Open Source Software, vol. 6, No. 60, Apr. 6, 2021, 4 pages.

Zhang et al., "ReCoRD: Bridging the Gap Between Human and Machine Commonsense Reading Comprehension", arXiv:1810.12885v1, Oct. 30, 2018, 14 pages.

International Search Report for PCT/US2021/046849, Mailed on May 27, 2022, 3 pages.

Lester et al., "The Power of Scale for Parameter-Efficient Prompt Tuning", arXiv:2104:08691v2, Sep. 2, 2021, 15 pages.

(56)  References Cited

OTHER PUBLICATIONS

Puigcerver et ak, "Scalable Transfer Learning with Expert Models",
arXiv:2009.13239v1, Sep. 28, 2020, 27 pages.

\* cited by examiner

600

OBTAIN AN EXAMPLE DATASET — 602

PROCESS THE EXAMPLE DATASET WITH A MACHINE-LEARNED MODEL TO TRAIN A FIRST PROMPT — 604

DETERMINE ONE OR MORE SECOND PROMPTS ARE ASSOCIATED WITH THE FIRST PROMPT — 606

GENERATE AN AUGMENTED FIRST PROMPT WITH THE MACHINE-LEARNED MODEL — 608

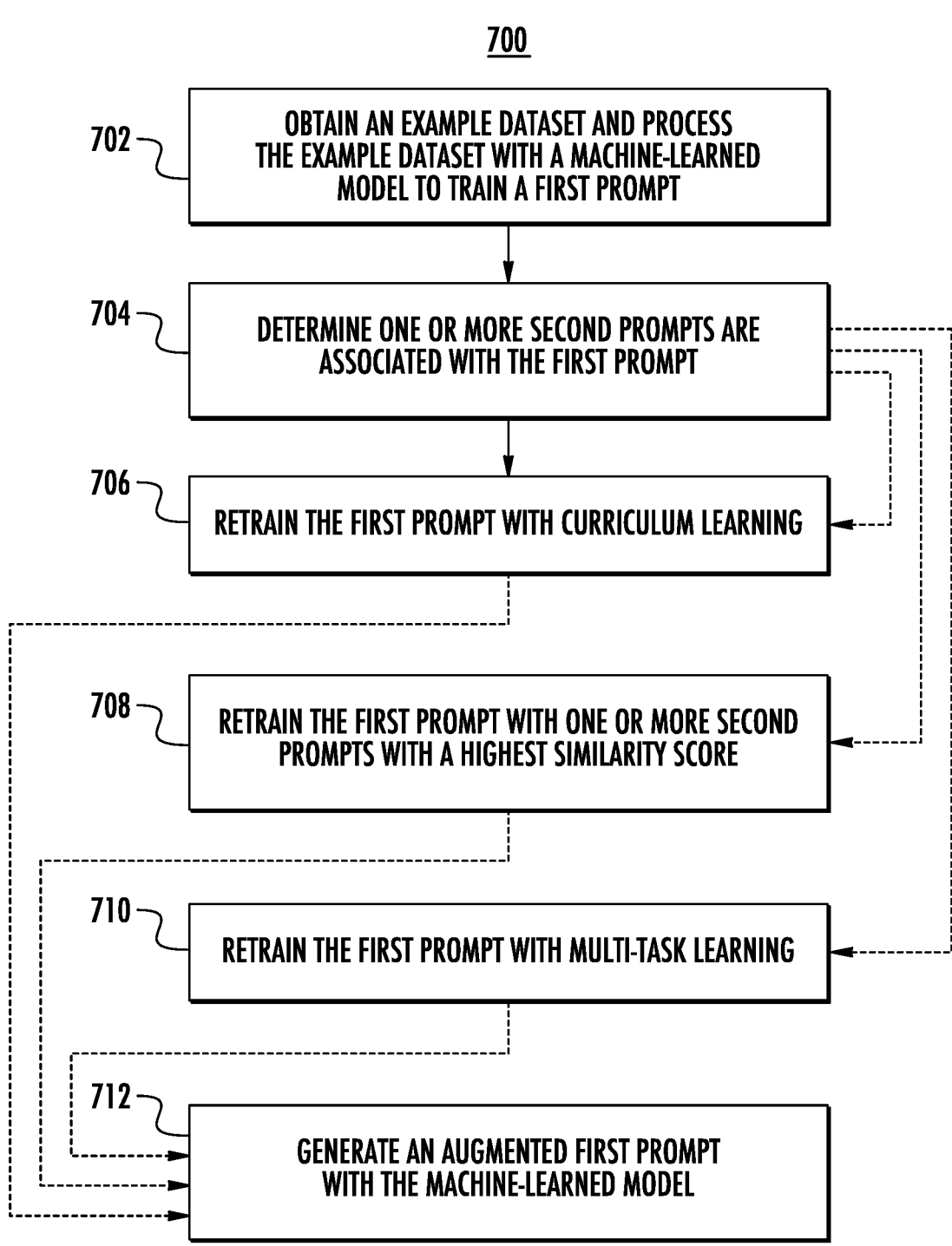

_700_

702 — OBTAIN AN EXAMPLE DATASET AND PROCESS THE EXAMPLE DATASET WITH A MACHINE-LEARNED MODEL TO TRAIN A FIRST PROMPT

704 — DETERMINE ONE OR MORE SECOND PROMPTS ARE ASSOCIATED WITH THE FIRST PROMPT

706 — RETRAIN THE FIRST PROMPT WITH CURRICULUM LEARNING

708 — RETRAIN THE FIRST PROMPT WITH ONE OR MORE SECOND PROMPTS WITH A HIGHEST SIMILARITY SCORE

710 — RETRAIN THE FIRST PROMPT WITH MULTI-TASK LEARNING

712 — GENERATE AN AUGMENTED FIRST PROMPT WITH THE MACHINE-LEARNED MODEL

_FIG. 7_

800

OBTAIN A PLURALITY OF TRAINING DATASETS ⟶ 802

PROCESS THE PLURALITY OF TRAINING DATASETS TO TRAIN A TRAINING PROMPT FOR EACH RESPECTIVE DATASET ⟶ 804

SELECT ONE OR MORE CANONICAL EXAMPLES ⟶ 806

GENERATE AN EXAMPLE DATASET BASED ON THE PLURALITY OF CANONICAL EXAMPLES ⟶ 808

GENERATE A META-PROMPT BASED ON THE EXAMPLE DATASET ⟶ 810

900

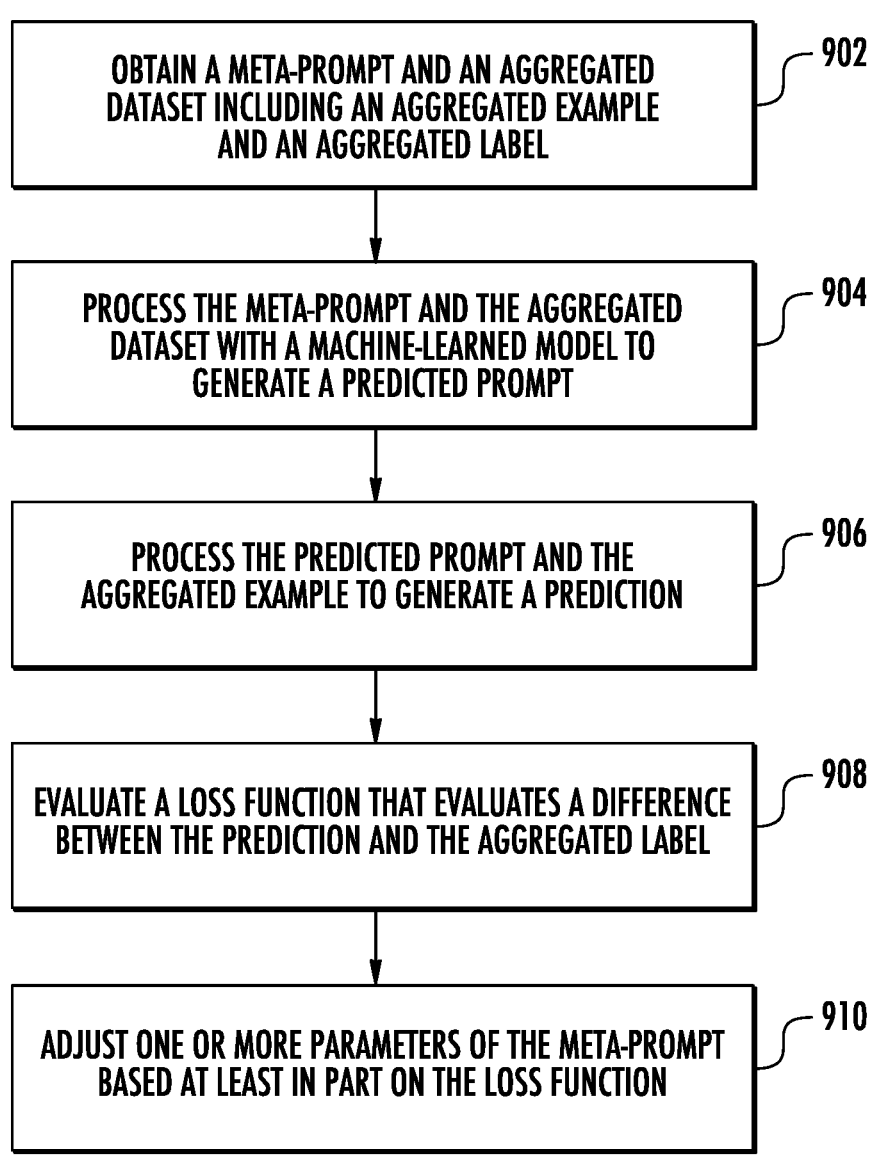

OBTAIN A META-PROMPT AND AN AGGREGATED DATASET INCLUDING AN AGGREGATED EXAMPLE AND AN AGGREGATED LABEL — 902

PROCESS THE META-PROMPT AND THE AGGREGATED DATASET WITH A MACHINE-LEARNED MODEL TO GENERATE A PREDICTED PROMPT — 904

PROCESS THE PREDICTED PROMPT AND THE AGGREGATED EXAMPLE TO GENERATE A PREDICTION — 906

EVALUATE A LOSS FUNCTION THAT EVALUATES A DIFFERENCE BETWEEN THE PREDICTION AND THE AGGREGATED LABEL — 908

ADJUST ONE OR MORE PARAMETERS OF THE META-PROMPT BASED AT LEAST IN PART ON THE LOSS FUNCTION — 910

FIG. 9

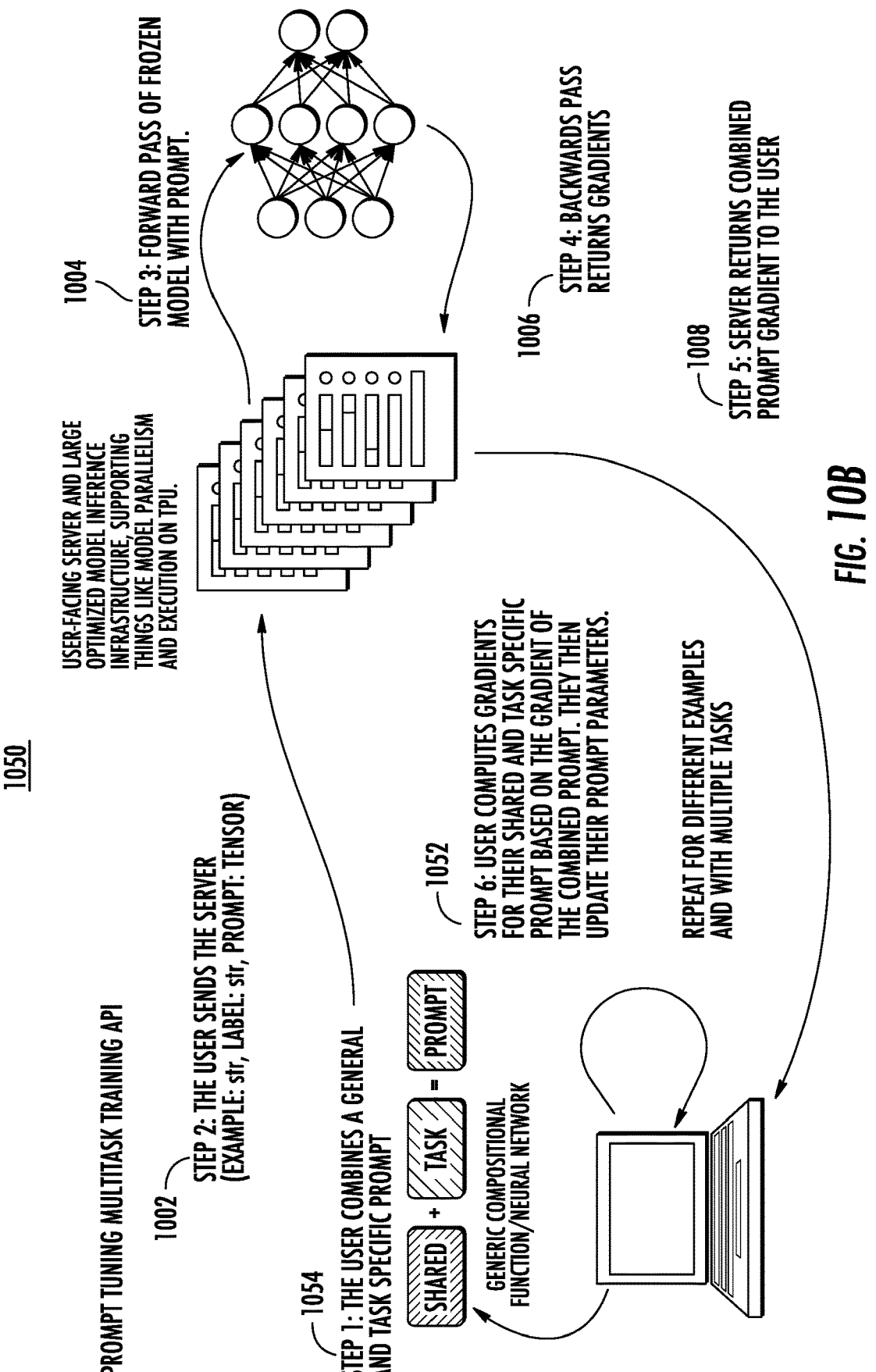

PROMPT TUNING MULTITASK TRAINING API

1002 — STEP 2: THE USER SENDS THE SERVER (EXAMPLE: str, LABEL: str, PROMPT: TENSOR)

1054 — STEP 1: THE USER COMBINES A GENERAL AND TASK SPECIFIC PROMPT

SHARED + TASK = PROMPT

GENERIC COMPOSITIONAL FUNCTION/NEURAL NETWORK

1004 — STEP 3: FORWARD PASS OF FROZEN MODEL WITH PROMPT.

USER-FACING SERVER AND LARGE OPTIMIZED MODEL INFERENCE INFRASTRUCTURE, SUPPORTING THINGS LIKE MODEL PARALLELISM AND EXECUTION ON TPU.

1006 — STEP 4: BACKWARDS PASS RETURNS GRADIENTS

1008 — STEP 5: SERVER RETURNS COMBINED PROMPT GRADIENT TO THE USER

1052 — STEP 6: USER COMPUTES GRADIENTS FOR THEIR SHARED AND TASK SPECIFIC PROMPT BASED ON THE GRADIENT OF THE COMBINED PROMPT. THEY THEN UPDATE THEIR PROMPT PARAMETERS.

REPEAT FOR DIFFERENT EXAMPLES AND WITH MULTIPLE TASKS

OBTAIN A TRAINING EXAMPLE AND A PROMPT FROM A USER COMPUTING DEVICE ⟍ 1102

PROCESS THE TRAINING EXAMPLE AND THE PROMPT WITH A FROZEN MODEL TO GENERATE ONE OR MORE PROMPT GRADIENTS ⟍ 1104

SEND THE ONE OR MORE PROMPT GRADIENTS TO THE USER COMPUTING DEVICE ⟍ 1106

RECEIVE A USER-INPUT TO AUGMENT THE PROMPT ⟍ 1108

GENERATE AN AUGMENTED PROMPT BASED ON THE USER-INPUT ⟍ 1110

1200

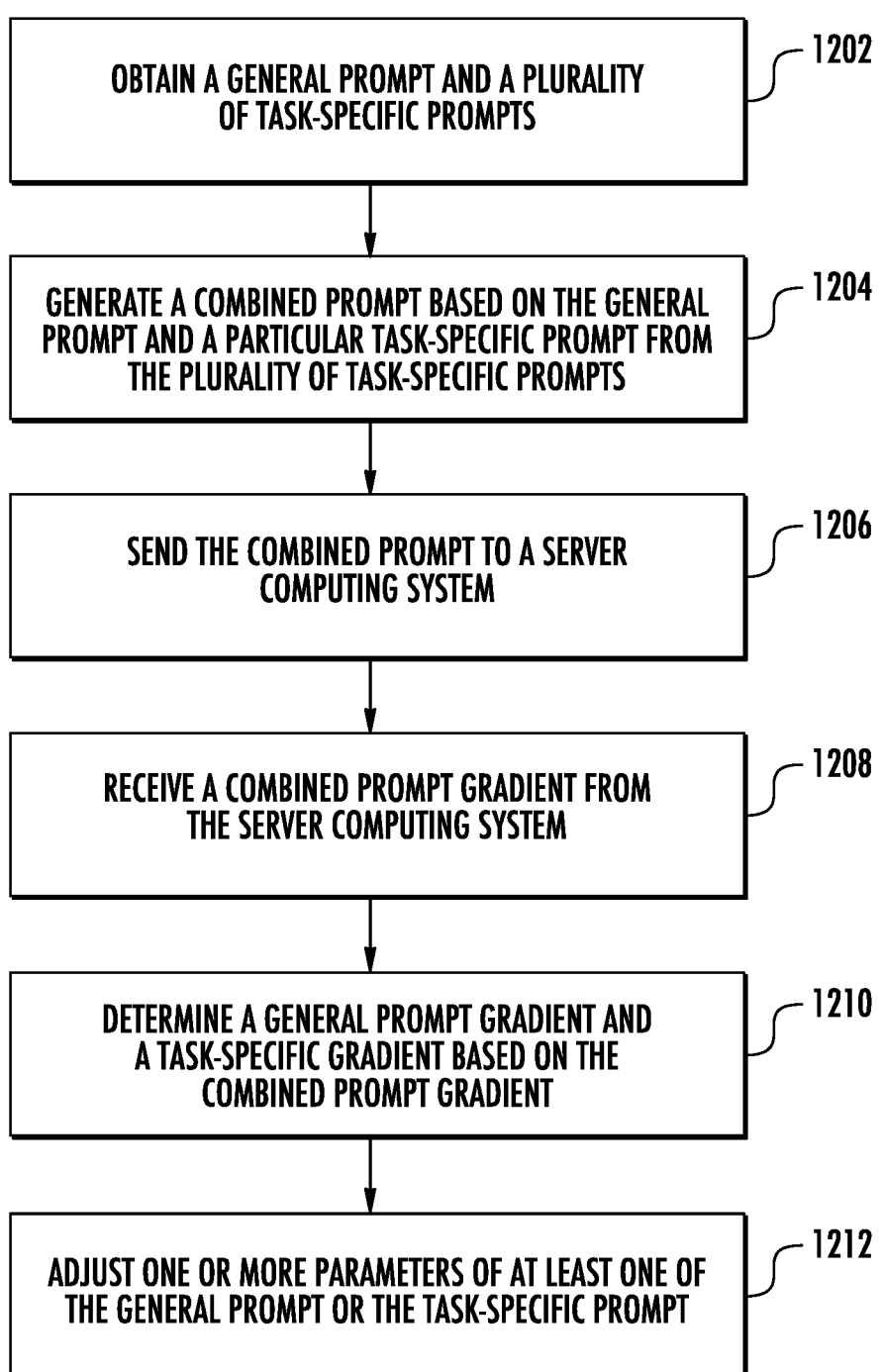

OBTAIN A GENERAL PROMPT AND A PLURALITY OF TASK-SPECIFIC PROMPTS — 1202

GENERATE A COMBINED PROMPT BASED ON THE GENERAL PROMPT AND A PARTICULAR TASK-SPECIFIC PROMPT FROM THE PLURALITY OF TASK-SPECIFIC PROMPTS — 1204

SEND THE COMBINED PROMPT TO A SERVER COMPUTING SYSTEM — 1206

RECEIVE A COMBINED PROMPT GRADIENT FROM THE SERVER COMPUTING SYSTEM — 1208

DETERMINE A GENERAL PROMPT GRADIENT AND A TASK-SPECIFIC GRADIENT BASED ON THE COMBINED PROMPT GRADIENT — 1210

ADJUST ONE OR MORE PARAMETERS OF AT LEAST ONE OF THE GENERAL PROMPT OR THE TASK-SPECIFIC PROMPT — 1212

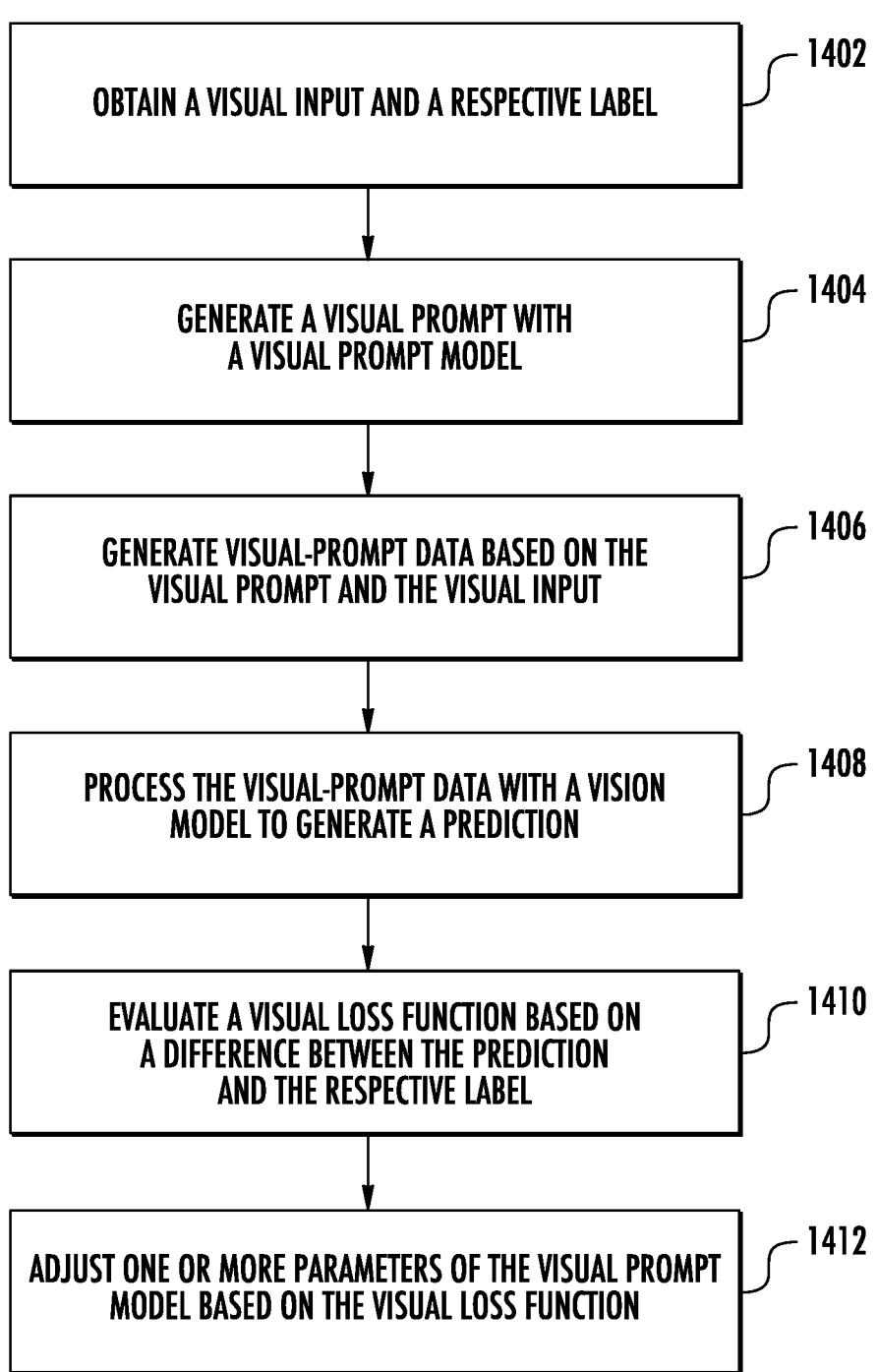

1400

OBTAIN A VISUAL INPUT AND A RESPECTIVE LABEL ⌐ 1402

GENERATE A VISUAL PROMPT WITH A VISUAL PROMPT MODEL ⌐ 1404

GENERATE VISUAL-PROMPT DATA BASED ON THE VISUAL PROMPT AND THE VISUAL INPUT ⌐ 1406

PROCESS THE VISUAL-PROMPT DATA WITH A VISION MODEL TO GENERATE A PREDICTION ⌐ 1408

EVALUATE A VISUAL LOSS FUNCTION BASED ON A DIFFERENCE BETWEEN THE PREDICTION AND THE RESPECTIVE LABEL ⌐ 1410

ADJUST ONE OR MORE PARAMETERS OF THE VISUAL PROMPT MODEL BASED ON THE VISUAL LOSS FUNCTION ⌐ 1412

OBTAIN INPUT DATA AND A PROMPT — 1602

PROCESS THE INPUT DATA WITH A MACHINE-LEARNED MODEL TO GENERATE A PREDICTION — 1604

PROVIDE THE PREDICTION AS AN OUTPUT — 1606

PROMPT TUNING USING ONE OR MORE MACHINE-LEARNED MODELS

RELATED APPLICATIONS

This application claims priority under 35 U.S.C. § 371 to and the benefit of International Patent Application No. PCT/US2021/046849 filed on Aug. 20, 2021. International Patent Application No. PCT/US2021/046849 is hereby incorporated by reference in its entirety.

FIELD

The present disclosure relates generally to prompt tuning. More particularly, the present disclosure relates to generation and/or tuning of prompts with semantic searches, meta-prompts trained to generate prompts, and visual prompt tuning.

BACKGROUND

Data collection can be hard for users as they start with just a few labeled examples for evaluation and training. In some current systems, the expansion of the data for prompt training can be based on similarity between examples, without consideration of the context of the task itself. The lack of consideration can cause the selection of examples that are not pertinent to a desired task. Selecting appropriate datasets to augment, or tune, a prompt can be difficult based on the lack of search refinement for the particular task.

Additionally, some current systems can include transfer learning. Transfer learning for large pretrained models can show great results and can be state of the art on a plurality of tasks. However, transfer learning can be difficult for many people to use due to computational resources needed and parallel computing expertise.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system including one or more processors, an example dataset from a user. The method can include processing, by the computing system, the example dataset with a machine-learned model to train a first prompt. In some implementations, the first prompt can be trained to generate data associated with the example dataset. The method can include determining, by the computing system, one or more second prompts are associated with the first prompt and generating, by the computing system, an augmented first prompt with the machine-learned model based at least in part on the one or more second prompts.

In some implementations, determining the one or more second prompts can include: performing, by the computing system, a search of a prompt repository to identify similar prompts to the first prompt and determining, by the computing system, the one or more second prompts based on the search of the prompt repository. The method can include generating, by the computing system, a similarity score for each of the one or more second prompts. In some implementations, the similarity scores can be determined based on a similarity between the first prompt and the second prompt.

In some implementations, generating the augmented first prompt can include retraining the first prompt on one or more second prompt datasets associated with the one or more second prompts with a highest similarity score. Generating the augmented first prompt can include obtaining, by the computing system, second prompt metadata associated with the one or more second prompts and processing, by the computing system, the second prompt metadata and the example dataset with the machine-learned model to generate the augmented first prompt. In some implementations, the second prompt metadata can include one or more second prompt datasets associated with the one or more second prompts. Generating the augmented first prompt can include multi-task learning based on the one or more second prompts. In some implementations, generating the augmented first prompt can include curriculum learning based at least in part on the one or more second prompts. The one or more second prompts can be obtained from a plurality of stored prompts stored on a server computing system. The method can include obtaining, by the computing system, a prompt tuning training application programming interface, and the machine-learned model can include a prompt tuning model of the prompt tuning training application programming interface. In some implementations, determining the one or more second prompts can include a semantic search including at least one of an L2 metric, a cosine metric, or a max product metric. The one or more second prompts can be determined based on a semantic search of a library of prompts stored with associated metadata for each respective prompt of the library of prompts. The associated metadata can include at least one of a frozen model utilized for training a respective second prompt, a training date for the respective second prompt, or a training dataset for the respective second prompt.

Another example aspect of the present disclosure is directed to a computing system. The system can include one or more processors and one or more non-transitory computer-readable media that collectively store instructions that, when executed by the one or more processors, cause the computing system to perform operations. The operations can include obtaining a plurality of training datasets and processing the plurality of training datasets to train a training prompt for each respective dataset. In some implementations, a prompt can include one or more learned parameters representative of a task. The operations can include selecting one or more canonical examples from each of the plurality of training datasets to determine a plurality of canonical examples and generating an example dataset based on the plurality of canonical examples. The operations can include generating a meta-prompt based on the example dataset. In some implementations, the meta-prompt can be configured to generate a predicted prompt based on the plurality of canonical examples.

In some implementations, the operations can include obtaining an aggregated dataset. The aggregated dataset can include an aggregated example and a respective label. The operations can include processing the aggregated example and the meta-prompt with a prompt creation model to generate a task-specific prompt for the aggregated example and processing the task-specific prompt and the aggregated example with a prediction model to generate a prediction. In some implementations, the operations can include evaluating a loss function that evaluates a difference between the prediction and the respective label and adjusting one or more parameters of the meta-prompt based at least in part on the loss function.

In some implementations, the operations can include obtaining an aggregated dataset. The aggregated dataset can include a task description. In some implementations, the operations can include processing the task description and the meta-prompt with prompt creation model to generate a task-specific prompt for the task description and processing the task-specific prompt and the task description with a prediction model to generate a prediction. The operations can include evaluating a loss function that evaluates the prediction and adjusting one or more parameters of the meta-prompt based at least in part on the loss function.

In some implementations, the plurality of training datasets can be obtained from a user computing device, and wherein the meta-prompt comprises a user-specific meta-prompt. Selecting the one or more canonical examples from each of the plurality of training datasets can include determining a specific training dataset from each of the plurality of training datasets based on a dataset-specific prompt generated based at least in part on the specific training dataset and a frozen model. The operations can include storing the meta-prompt on a server computing system, receiving a prompt request from a user computing device, generating a requested prompt based on the prompt request and the meta-prompt, and sending the requested prompt to the user computing device.

Another example aspect of the present disclosure is directed to one or more non-transitory computer-readable media that collectively store instructions that, when executed by one or more processors, cause a server computing system to perform operations. The operations can include obtaining, via an application programming interface, a training example and a prompt from a user computing device. In some implementations, the training example can be associated with the prompt, and the prompt can include a set of learned parameters that represent a task. The operations can include processing the training example and the prompt with a frozen model to generate one or more prompt gradients. The prompt gradient can be based at least in part on a prediction generated based on the training example. The operations can include sending, via the application programming interface, the one or more prompt gradients to the user computing device for generating an augmented prompt.

In some implementations, processing the training example and the prompt with the frozen model to generate the one or more prompt gradients can include: a forward pass of the frozen model with the training example and the prompt; and a backwards pass to return the prompt gradients. The prompt can include a general prompt and a task-specific prompt.

Another example aspect of the present disclosure is directed to a computer-implemented method for prompt-based processing of images. The method can include obtaining, by a computing system including one or more processors, an input image and a prompt. In some implementations, the prompt can be structured as at least one of a padding variable around the border of the input image, a channel variable for the input image, or a mask variable for the input image. The method can include processing, by the computing system, the input image with a machine-learned model to generate a prediction and providing, by the computing system, the prediction as an output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts a flow chart diagram of an example method to perform prompt tuning with semantic search according to example embodiments of the present disclosure.

FIG. 9 depicts a flow chart diagram of an example method to perform meta-prompt training according to example embodiments of the present disclosure.

FIG. 10B depicts a block diagram of an example prompt tuning multi-task training API according to example embodiments of the present disclosure.

FIG. 12 depicts a flow chart diagram of an example method to perform multi-task prompt tuning with a prompt tuning training API according to example embodiments of the present disclosure.

FIG. 13A depicts a block diagram of an example pad tuning model according to example embodiments of the present disclosure.

FIG. 13B depicts a block diagram of an example channel tuning model according to example embodiments of the present disclosure.

FIG. 14 depicts a flow chart diagram of an example method to perform visual prompt tuning according to example embodiments of the present disclosure.

Figure 1A:
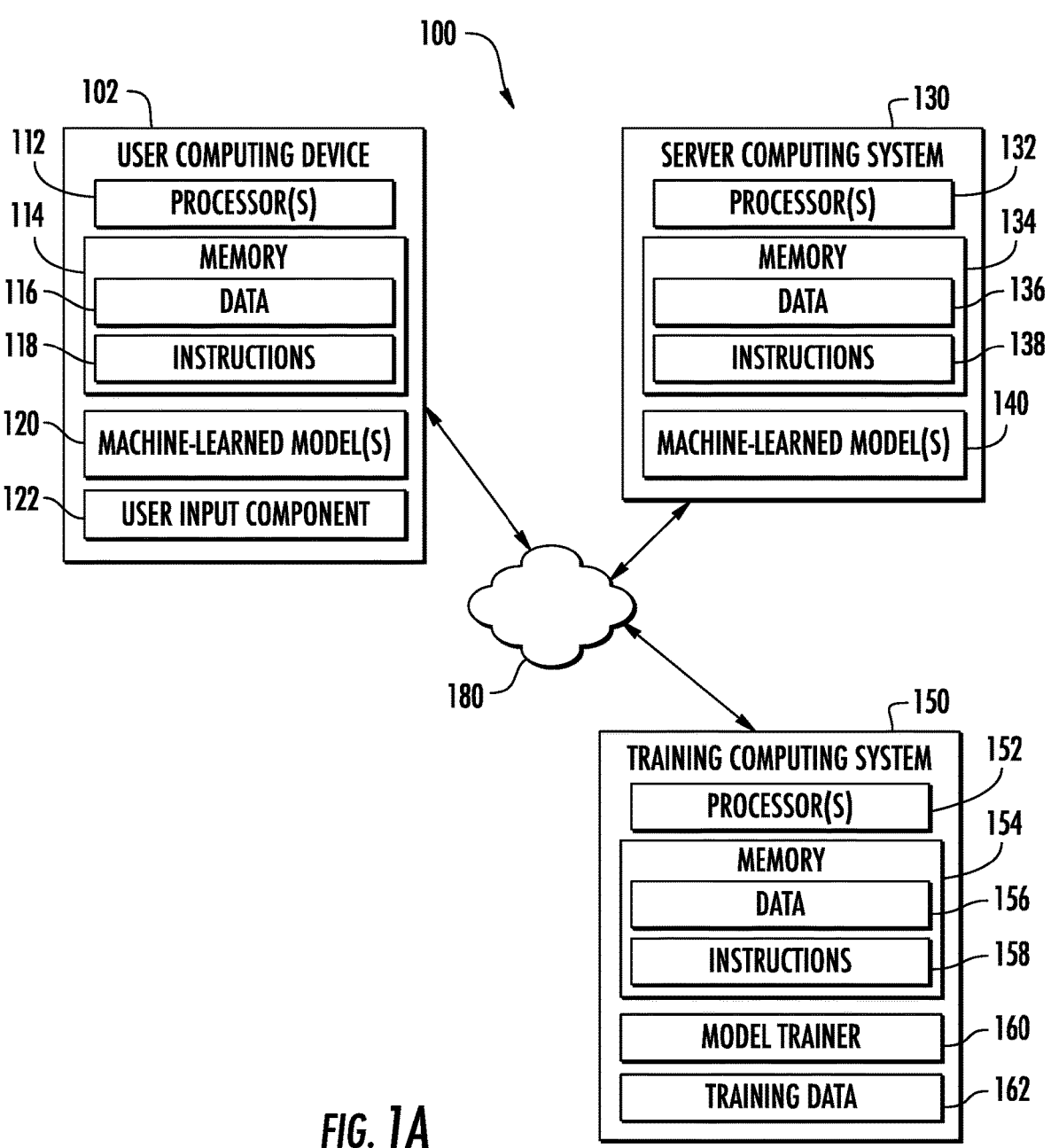
FIG. 1A depicts a block diagram of an example computing system that performs prompt tuning according to example embodiments of the present disclosure.

Reference numerals that are repeated across plural figures are intended to identify the same features in various implementations.

DETAILED DESCRIPTION

Overview

Generally, the present disclosure is directed to systems and methods for prompt tuning using one or more machine-learned models. The systems and methods for prompt tuning may include a variety of techniques for prompt generation or tuning. For example, the systems and methods can include semantic searching for finding similar prompts to use for further tuning. Additionally and/or alternatively, the systems and methods can generate and/or utilize a meta-prompt for prompt generation and tuning.

For example, the systems and methods disclosed herein can leverage semantic searching of prompts to obtain larger datasets, which may then be used for prompt tuning or may be used for other purposes. For example, the systems and methods can include obtaining an example dataset. The example dataset can be processed to train a first prompt. In some implementations, the systems and methods can include determining one or more second prompts are associated with the first prompt. One or more second prompt datasets can be determined to be associated with the one or more second prompts. The one or more second prompt datasets can then be used to retrain the first prompt to generate the augmented first prompt.

Additionally and/or alternatively, the systems and methods can include a prompt tuning training API that can allow a user to train a prompt, to be used with a large frozen model, for their task via interactions with a server and handles the actual model inference. In some implementations, the prompt tuning training API can be used for making predictions with the model and prompt, and therefore, allowing users to leverage a large model without dealing with the issues of deployment. The users can train the prompt without having to reveal their full dataset to the server, and the server may not have to reveal information about the frozen model, like architecture, weights, etc. In some implementations, the prompt may be trained by a user by using the API by utilizing multi-task training. Multi-task training may involve parameters being combined for multiple tasks. Such a system and/or method can allow a user computing device with limited computational resources (e.g., a constrained memory space or limited processing power) and/or a limited amount of data stored thereon to leverage a large model and additional datasets stored in a server to train a prompt for use by the user computing device.

The learned prompts can then be used to create a large database of prompts for dataset mapping. Similarity search in this prompt space can be used to find and retrieve related datasets, ordered by the similarity of the prompt. The returned datasets can then be used for techniques like multi-task learning, curriculum learning, and visualization. Users can submit their own datasets and accompanying prompt to the database.

Prompt tuning can be costly as prompt tuning can involve forward and backward passes of large models, making the process hard to scale to thousands and thousands of tasks. Therefore, the systems and methods may utilize a meta-prompt, a prompt that generates prompts, and the meta-prompt can be used to generate prompts for a large variety of tasks.

Additionally and/or alternatively, prompt tuning can be used to produce a meta-prompt from a representative part of a dataset. The meta-prompt can then be used to generate prompts. These generated prompts can then be used with input examples to solve a task.

In some implementations, the systems and methods can be applied to natural language processing but may be trained for computer-vision tasks.

A prompt can correspond to and/or represent a task. In some implementations, prompts can be trained to generate data associated with a respective dataset. Moreover, the prompts can include one or more learned parameters representative of a task.

In particular, the systems and methods disclosed herein can include one or more of semantic search for prompt tuning, meta-prompt generation and use, prompt tuning training API, and vision prompt tuning. Example implementations of each aspect can be implemented and configured in a variety of ways as disclosed below. Each aspect can be implemented individually or in any combination. For example, in one example implementation, a meta-prompt can be generated and used to generate a prompt, the prompt can be used as a query for semantic search, and the results can be used for tuning the generated prompt and the meta-prompt. These aspects can be implemented into a prompt tuning training API for individual task training or for multi-task training. In some implementations, the prompts can be vision prompts generated based on vision task training (e.g., pad tuning training, channel tuning training, mask tuning training, and/or prompt tuning for a vision transformer).

The systems and methods disclosed herein can leverage semantic searching of prompts for prompt tuning. In some implementations, the systems and methods can include obtaining an example dataset from a user.

The example dataset can be processed with a machine-learned model to train a first prompt. In some implementations, the first prompt can be trained to generate data associated with the example dataset. In some implementations, the systems and methods can include using a prompt tuning training application programming interface. The prompt tuning training application programming interface can include one or more machine-learned models, and the one or more machine-learned models may include the one or more prompt tuning models.

The systems and methods can then determine one or more second prompts are associated with the first prompt. The one or more second prompts can be obtained from a plurality of stored prompts stored on a server computing system.

In some implementations, a search of a prompt repository can be performed to identify similar prompts to the first prompt. The one or more second prompts can then be determined based on the search of the prompt repository. The prompt repository can include a library of pretrained prompts. In some implementations, the prompt repository can include prompts generated based on datasets from a plurality of users.

In some implementations, the systems and methods can include generating a similarity score for each of the one or more second prompts. The similarity scores can be determined based on a similarity between the first prompt and the second prompt. Additionally and/or alternatively, determining the one or more second prompts can include a semantic search. In some implementations, the semantic search can include the use of an L2 metric, a cosine metric, or a max product metric.

In some implementations, the one or more second prompts can be determined based on a semantic search of a library of prompts stored with associated metadata for each respective prompt of the library of prompts. The associated metadata can include at least one of a frozen model utilized for training the respective prompt, a training date for the respective prompt, or a training dataset for the respective prompt.

The systems and methods can then generate an augmented first prompt with the machine-learned model based at least in part on the one or more second prompts. Generating the augmented first prompt can involve retraining the first prompt on one or more second prompt datasets associated with the one or more second prompts with the highest similarity scores.

In some implementations, the systems and methods may include obtaining second prompt metadata associated with the one or more second prompts. The second prompt metadata can include one or more second prompt datasets associated with the one or more second prompts. The second prompt metadata and the example dataset can be processed with the machine-learned model to generate the augmented first prompt. In some implementations, generating the augmented first prompt can include multi-task learning based on the one or more second prompts. In some implementations, mixture rates (e.g., how much of each dataset to use) can be based on prompt similarity. Additionally and/or alternatively, generating the augmented first prompt can include curriculum learning based at least in part on the one or more second prompts. In some implementations, generating the augmented first prompt can include using the second prompts as an initialization point for retraining the initial prompt. Additionally and/or alternatively, the second prompt(s) can be used to generate combinations of the prompt.

The augmented first prompt can then be utilized to generate one or more datasets, which can then be stored in a database to train or retrain future prompts. In some implementations, the augmented first prompt can be stored in a library of prompts and may be used for semantic search prompt tuning of other prompts.

The systems and methods disclosed herein can use prompt tuning to build a representation of a dataset (the prompt) that can be used to build a semantic search over datasets. The results from querying the database can then be used to augment the user's dataset or training procedure in various ways.

The systems and methods for prompt tuning utilizing semantic search can receive a small dataset from a user to train a prompt, and the trained prompt can then be used to search for similar prompts for prompt tuning (e.g., prompt retraining). The users can have a small dataset they want to expand, augment, do better on, quantify, or overall refine. The user can send one or more (example, label) pairs to be used as input for the prompt tuning system. In some implementations, the prompt tuning system can include one or more prompt tuning machine-learned models and/or a prompt training application programming interface (API).

For example, a user can have one-or-few-shot examples for a task they want to do well on. Instead of collecting more data, the users can utilize a prompt tuning semantic search feature to find datasets, tasks, and prompts that are similar to their task. In some implementations, the prompt tuning semantic search can begin with a user sending a prompt tuning API a small dataset of examples.

An initial/query prompt (e.g., a low quality prompt) can be trained with the dataset. For example, the server, or the server in coordination with the user via the prompt tuning API, can train an initial prompt based on the examples the user provides. Alternatively and/or additionally, the first prompt may be generated with the use of a meta-prompt for prompt generation.

A semantic search can then be completed to find one or more associated prompts (e.g., similar pretrained prompts). For example, the semantic search can involve comparing the initial/query prompt to a library of pretrained prompts, supplied by the service/cloud provider for various tasks. Each prompt can have associated metadata. Multiple metrics such as L2, cosine, or max product can be used to determine similar prompts.

The initial user prompt, or first prompt, can then be utilized for semantic search over a library of prompts (e.g., a library of second prompts, in which the library of second prompts includes pretrained prompts trained based on datasets not used by the user). These prompts can have associated metadata, such as the frozen model used, the date trained, and, most importantly, the dataset used.

The search can use a similarity function between prompts such as cosine distance. In some implementations, the library of prompts can be built by pre-training a plurality of prompts on a large collection of open-source tasks/datasets. The library of prompts can be stored on a server computing system that allows other users to upload their own prompts for generating a larger library. User supplied prompts can be provided as freely accessible to all or can be provided as restricted to certain users (e.g., a prompt may only be accessible to users with certain credentials or may be accessible in exchange for other resources), establishing a service for curated datasets. The utility of the prompts can be determined by a variety of metrics and the determined utility may be utilized for prompt ranking and/or for user ranking. In some implementations, the library of prompts can include prompts trained on a single dataset and/or prompts trained on a plurality of datasets. The prompts may represent a particular task.

The prompts (i.e., second prompts) determined to be associated with the first prompt and the metadata related to those prompts, can be ordered by their similarity to the query prompt. The second prompts, and associated metadata such as links to the dataset and prompt submitter information, can be returned to the user. The second prompts and/or their associated metadata can then be utilized to retrain or refine the first prompt. The prompt tuning can involve curriculum learning, multi-task learning, and/or retraining with the most similar second prompts being utilized as initialization points.

For example, the returned datasets associated with the second prompts can be utilized for curriculum learning. Curriculum learning can involve ordering the datasets by how similar their respective prompt is to the user prompt, before finally re-training on their own dataset to create a final prompt. Therefore, the users can use the returned datasets to do curriculum learning. Training on one task at a time ordered by increasing similarity to their task before finally retraining with their original examples. In some implementations, the order can be determined based on prompt similarity.

Another possible implementation for prompt tuning with the second prompts can involve determining the most similar second prompt or a combination of the most similar second prompts and using the one or more determined most similar prompts as the initialization for another round of training.

For example, the users can use the prompts returned as an initialization point for their prompt. The initialization point setting can be done with the most similar prompt or a combination of multiple prompts. The combination of the multiple prompts can be weighted by the similarity of the prompt. Alternatively and/or additionally, the combination can include a default equal combination.

Alternatively and/or additionally, the returned datasets associated with the second prompts can be used for multi-task learning in conjunction with the user-input dataset (i.e., example dataset). In some implementations, the users can use the returned datasets for multi-task learning to boost performance on their actual task. The mixing rates of different datasets can be adjusted based on the similarity of the dataset's respective prompt and the initial user prompt.

Alternatively and/or additionally, a user can utilize the resulting tasks for a variety of uses (e.g., visualization, ranking of task difficulty, etc.). The user may be able to contact the original developers of these prompts via the user interface of the semantic search prompt tuning API in order to collaborate on future work.

The systems and methods can be repeated iteratively to continue to refine, or tune, the prompt. The user may repeat this process, using the resulting prompt, until the user reaches a result they are happy with. Moreover, in some implementations, after the first cycle the user can send the resulting prompt directly to the semantic search API, instead of re-training a prompt on the user examples. The systems and methods disclosed herein can also allow for use of the semantic search API for other applications such as task search and task complexity analysis.

Benefits of leveraging semantic search for prompt tuning can include enabling the use of similar datasets (e.g., for data augmentation) to increase user model performance. Moreover, the systems and methods for prompt tuning using semantic search can allow for the use of public datasets and can allow for the addition of user datasets to the collection. In addition, the systems and methods can be implemented to allow users a medium to find others working on similar problems and reach out for collaboration.

Additionally and/or alternatively, the systems and methods disclosed herein can be utilized for generating a meta-prompt that can generate prompts based on an input. For example, the meta-prompt can be a prompt that is trained to generate prompts based on input datasets or input descriptions.

The systems and methods can include obtaining a plurality of training datasets. The plurality of training datasets can be obtained from a user computing device, and the meta-prompt can include a user-specific meta-prompt. Alternatively and/or additionally, the meta-prompt may include a general purpose meta-prompt.

The plurality of training datasets can be processed to train a training prompt for each respective dataset. In some implementations, the training prompt can be trained to generate data associated with the respective dataset.

One or more canonical examples can be selected from each of the plurality of training datasets. In some implementations, selecting the one or more canonical examples from each of the plurality of training datasets can include determining a specific training dataset from each of the plurality of training datasets based on a dataset-specific prompt generated based at least in part on the specific training dataset and a frozen model.

The systems and methods can include generating an example dataset based on the plurality of canonical examples.

The example dataset can then be utilized to generate a meta-prompt. In some implementations, the meta-prompt can be configured to generate a predicted prompt based on the plurality of canonical examples.

After the meta-prompt is generated, the systems and methods can further train the meta-prompt for refined prompt generation. The systems and methods for training and refining the meta-prompt can include obtaining an aggregated dataset. The aggregated dataset can include an aggregated example and a respective label. The aggregated example and the meta-prompt can be processed with a prompt creation model to generate a task-specific prompt for the second example dataset. The task-specific prompt and the second example dataset can then be processed with a prediction model to generate a prediction. The prediction and the respective label can then be compared in order to evaluate a loss function. One or more parameters of the meta-prompt can then be adjusted based on the gradient of the loss function.

Alternatively and/or additionally, the meta-prompt can be tuned or refined by obtaining an aggregated example, in which the aggregated dataset can include a task description. The systems and methods can process the task description and the meta-prompt with a prompt tuning model to generate a task-specific prompt for the task description. The task-specific prompt, an example, and the task description can be processed with a prediction model to generate a prediction. The prediction can then be used in order to evaluate a loss function (e.g., the loss function may be evaluated by comparing the prediction and a respective label for the example.). One or more parameters of the meta-prompt can then be adjusted based on the loss function.

Once the meta-prompt is generated, the meta-prompt can be stored on a server computing system to be utilized for prompt generation and refinement. The systems and methods for prompt generation can include receiving a prompt request from a user computing device and generating a requested prompt based on the prompt request and the meta-prompt. The requested prompt can then be sent back to the user computing device.

Prompt tuning can involve a large labeled dataset where the prompt representation is learned via back propagation. However, that technique can involve full forward and backwards passes of the model. Therefore, the computational complexity of prompt tuning can be the same as model tuning despite prompt tuning only updating a single parameter. Thus, the training can still be costly, especially if one intends to create a huge library of prompts.

The systems and methods disclosed herein can be utilized for generating a meta-prompt, which can reduce the computational cost for generating and tuning prompts. A meta-prompt can be a prompt, learned via prompt tuning, that when processed with a few input examples produces a prompt. The output prompt can be used by the machine-learned model (e.g., the frozen model) to solve the task sketched by the input examples. The meta-prompt can enable the scaling to a library of millions of prompts.

Generating a meta-prompt can involve processing a plurality of datasets, a plurality of labels, and a plurality of prompts in order to train one or more parameters that can allow the meta-prompt to generate prompts based on input datasets. The trained meta-prompt can be used for generating prompts on out of domain datasets and/or may be used to generate new or refined prompts for in-domain datasets.

For example, the systems and methods for generating a meta-prompt can include generating or obtaining a plurality of datasets. The plurality of datasets can include a variety of datasets representative or descriptive of a plurality of different tasks. The plurality of datasets can be obtained from a public repository and/or generated with one or more machine-learned models. In some implementations, the plurality of datasets can include public datasets, synthetic datasets harvested from the web, internal datasets, etc. The datasets can be vertical specific to create several meta-prompt offerings, each catering to users from different domains.

The systems and methods for training and/or generating a meta-prompt can include training a training prompt for each dataset of the plurality of datasets. Each dataset can be processed to generate the training prompt for each respective dataset. The dataset and prompt pairs can then be used to generate a meta-prompt or may be used to generate a database or library to enable the semantic search prompt tuning discussed herein. In some implementations, a frozen model can be used for training and/or may be used for implementation of the meta-prompt prompts.

The systems and methods can then include selecting canonical examples from the dataset. In some implementations, the canonical examples can be selected based on the generated prompt. The canonical examples can be representative examples from the datasets. In some implementations, five to ten examples can be selected from each dataset, in which each example is representative of that dataset. Additionally and/or alternatively, a frozen model can be used for selection.

Data selection may involve selecting examples whose model encoding is most similar to the centers of k-means clusters, selecting examples who are close to the decision boundary of the prompted model, and/or selecting examples that are similar but have opposite labels. In some implementations, data selection can be exposed as a secondary service to help users generate prompts later on.

The canonical examples can then be used to generate a dataset of few-shot examples for the prompts. The few-shot examples for the prompts, or example dataset, can then be utilized to train, or generate, a meta-prompt. Generating, or training, a meta-prompt that generates prompts can involve processing the example dataset and prompt pairs of the example dataset with a machine-learned model. The input to the model can be the prompt and the (input, output) pairs (e.g., an example and a prompt) that make up the examples.

The model can output a prompt with the first K tokens of the encoder. A loss can be calculated between the predicted prompt and the actual prompt produced for this dataset. The losses can include, but are not limited to, L2, Von Mises Fisher, and/or Cosine Distance.

When paired with examples from a dataset the meta-prompt can be used to generate a new prompt that will solve the task specified by the examples. In some implementations, the frozen model can be used to generate the prompts. Reading the example text can involve language understanding using a strong pretrained encoder. The strong pretrained encoder can process the input the same way the prompted frozen model can.

In some implementations, meta-prompt creation may involve joint training. In some implementations, the systems and methods for meta-prompt tuning can involve inputting a meta-prompt and one of the aggregated datasets into the model. A single meta-prompt variable may be initialized. The variable can be unique, dataset-independent, and may be updated as we train. The prompt variable and one of several aggregated datasets may be fed into our prompt generation model. The model can either be shared or disjointed from the pretrained frozen model that may take the output of this model (e.g., the generated prompt) as input. The model and the frozen model may be initialized to match in order to have a shared language understanding.

A dataset may be aggregated (e.g., multiple ways, sampling of examples, concatenation, encoding via a model, selection of representative examples, etc.). The model can output a prompt for that dataset. The prompt generation model can generate a prompt value based on the meta-prompt and the aggregated dataset. The generated prompt can be used with a downstream frozen model to solve examples from our dataset. The prompt can then be replicated and added to each example in a batch from the dataset. For example, the generated data-dependent prompt can be added to each example in a batch from the dataset, to be used in prompt tuning.

The data-dependent prompt and example can then be fed into the model to make a prediction. More specifically, in some implementations, the generated prompt and the example batch can be fed into the frozen model, a forward pass can be done, and a prediction can be created. A loss can then be calculated, and the error can be backpropagated all the way back to the meta-prompt producing a gradient. The labels from the example batch are used to calculate a loss and do backpropagation through both networks, all the way back to the meta-prompt.

The meta-prompt can then be updated based on its gradient, and the process can be repeated again. Each iteration can use a different dataset, a different batch of examples, a different result of any sampling aggregation, etc.

In some implementations, meta-prompt generation can be provided as a service. For example, a user can send multiple datasets to the server computing system. A user can use the meta-prompt service to generate a meta-prompt that is specific to the user and their data.

The systems and methods for using the meta-prompt service can begin with the user uploading their multiple datasets to the server computing system. To expand the number of datasets, which can increase meta-prompt quality, the user can use the prompt tuning semantic search API to find related datasets to include. In some implementations, the server computing system can generate a meta-prompt based on the supplied user datasets. The model can return the user-specific meta-prompt for the user dataset, and the server computing system can then send the meta-prompt back to the user computing system. The meta-prompt can then be stored by the user computing system to be later used for prompt generation. The generated meta-prompt can then be utilized for model inference and prompt generation. For example, a few-shot dataset can be input as multiple (example, label) pairs into a model with a meta-prompt in order to generate a prompt, which can be used to solve a task defined by the (example, label) pairs.

In some implementations, examples can be selected with a data selection service that helps select examples that can generate better prompts when used with a frozen model. In some implementations, the inputs and the meta-prompt can be processed by a frozen model. Additionally and/or alternatively, the user input may include a task to be completed by the prompt to be generated. In some implementations, a server computing system may first train a prompt on the labeled examples and then may use the prompt tuning semantic search API to find one of many meta-prompts that can be specific to some vertical.

The model can output a prompt, which can then be provided to the user who input the dataset. The user may then input the generated prompt and the example into a model for model inference. In some implementations, the prompt can be generated and processed for model inference by a singular model, which can include one or more sub-blocks.

In some implementations, the systems and methods for model inference leveraging a prompt generated with a meta-prompt can involve a server computing system. For example, the server computing system can run the model a first time to generate a task-specific prompt from the example dataset and the meta-prompt. The server computing system can then run the model again. The second time can be with the task prompt and an example input.

The model can be fed the prompt and example input. The model can be the same one used to generate the prompt or may be a different model separate from the first model. The model can then return a prediction. The model can then make a prediction, which can then be returned to the user. In an implementation with a server computing system, the server can return the prediction to the user, the inner loop can be the model inference.

Benefits of a meta-prompt generation and use can include the ability to scale the creation of prompts to many, many more tasks; the ability to create vertical-specific meta-prompts for certain domains; and an API to create client-specific meta-prompts for a specific user.

Additionally and/or alternatively, the systems and methods can be implemented as part of a prompt tuning service (e.g., a prompt tuning user interface may be provided to users as part of a prompt tuning web service). The prompt tuning service can utilize a prompt tuning application programming interface.

The systems and methods can include obtaining a training example (e.g., an example dataset and a label) and a prompt from a user computing device. In some implementations, the training example can be associated with the prompt. In some implementations, the prompt can include a general prompt and a task-specific prompt.

The training example can include one or more examples and/or one or more task descriptions. The training process can involve supervised training or unsupervised training. Therefore, the training example can be a supervised example or an unsupervised example. In some implementations, the training example can include an example and a label, in which the label is a respective label for the example. Additionally and/or alternatively, the training example can be a fine-tuning example or a pre-training example.

The training example (e.g., the example dataset and the respective labels) and the prompt can be processed with a machine-learned model (e.g., a frozen model) to generate one or more prompt gradients. The prompt gradient can be based at least in part on a difference between the label and a predicted label. The predicted label can be generated based on the example.

Processing the training example (e.g., the example dataset and the label) and the prompt with the frozen model to generate the one or more prompt gradients can include a forward pass of the frozen model with the training example and the prompt; and a backwards pass to return the prompt gradients. The one or more prompt gradients can be sent to the user computing device.

In response to the prompt gradients, the user computing device may receive one or more inputs, which can be used to generate a user-input. The user-input can be sent to the server computing system. The server computing system can receive a user-input to augment the prompt. An augmented prompt can be generated based on the user-input. For example, in some implementations, the user-input can include approval of, or interactions with, the prompt gradient, which can be sent to the server which will cause the server computing system to update and return a new prompt. Alternatively and/or additionally, the user can update the prompt based on the gradient with whatever optimization strategy they want (e.g., in some cases, the user may track an optimizer state, which can be included in a user-input). The updated prompt may then be sent to the server computing system.

Additionally and/or alternatively, the systems and methods can include a training API for prompt tuning that can remove or reduce the computational cost for user computing devices (e.g., a user computing device). The training API for prompt tuning can allow anyone to leverage a large scale model. The training API can allow access to the model itself (e.g., through models as a service, MaaS). The technique can be similar to offering a bare metal/VM server that the user can do what they want with instead of a specific high-level application (e.g., text classification which would be like a managed database instance).

The systems and methods disclosed herein can involve a prompt tuning training API. The prompt tuning training API can be configured to receive data. The data can include an example, a label, and a prompt (e.g., example: str, label: str, prompt: tensor). The data may be input and received by the API in order to train a model on their dataset. In some implementations, the dataset can include a collection of characters (e.g., numbers, letters, or symbols), visual data (e.g., images, videos, iconographic symbols, etc.), and/or audio data (e.g., music data, speech data, etc.).

The API can run the inputs through a forward pass of the frozen model. For example, the server computing system that is optimized for running the frozen model (distributed across machines and datacenters, uses specialized accelerators, and support for model parallelism), can perform a forward pass of the model. The example can be used as an input to the model, and the prompt can be prepended to the input. This forward pass may produce a label and may be used as a prompt tuning inference for the API. In some implementations, the one or more machine-learned models can be frozen in order to batch multiple users. Therefore, the systems and methods can keep the language model in memory.

A backwards pass can then be completed in order to return gradients. More specifically, in some implementations, a standard backpropagation yielding gradients for one or more parameters can be generated based on the loss between the predicted label and the supplied label.

The prompt gradients may be provided to the computing system that input the inputs. The inputting computing system may not have access to the frozen model, and the model as a service (MaaS) computing system may not have access to the full dataset or the prompt parameters.

The input computing system may update the prompt based on the received gradients using a variety of methods (e.g., user-input updates or automated updates). The process for training may continue until convergence or until the user ends the training process.

Additionally and/or alternatively, the systems and methods disclosed herein can be used for prompt tuning multi-task training and may involve an API configured for prompt tuning multi-task training. The systems and methods can include combining a general prompt and task specific prompt (e.g., a user may combine a general prompt for a group of tasks and a task-specific prompt for a specific task.).

Moreover, the combination can include a shared prompt that is the same value for each task and a set of N task prompts, one for each task. The shared parameter can represent a mixture of tasks, or the shared parameter can be used across a whole computing system network, making it more of a user-specific, or network-specific, prompt.

The first step can have a user combine the shared and task-specific prompts through a composition function of the user's choice. Example combinations can include, but are not limited to, addition, concatenation, and projection with an affine transform. The combination can also keep the user in control of the model parameters. In some implementations, the users may send the server a dataset (e.g., example: str, label: str, prompt: tensor).

A forward pass of a frozen model with the prompt can be completed. The optimized server can compute the forward pass based on the user's input example and their prompt, which can be the combination of the shared and task prompts. The output can be a label and can be used for a multi-task inference API.

A backwards pass can then be completed in order to return prompt gradients. The prompt gradients can be based on the predicted label and the user provided label. The combined prompt gradient can be returned back to the user or may be used internally to adjust the parameters of the one or more prompts. In some implementations, the user computing system may update the prompts based on the prompt gradients. For example, updating parameters for their shared prompt and task-specific prompt based on the gradient of the combined prompt. The user can use the gradient of the combined prompts to derive the gradients of the shared prompt and the task-specific prompt. The user can then use these parameters to update each prompt using whatever update rules they choose.

The user can then repeat the process for other examples in their various task datasets. The user can update their prompts with a variety of techniques. The system can repeat this processing, varying the input example, the task they are running (and therefore the task specific prompt) while using the same shared prompt.

Benefits of the API systems and methods can include the model can be utilized by a plurality of users, while limiting the details and parameters shared between users, and a user can produce several prompts for a simple ensemble effect. Furthermore, by leveraging the computational resources of a server and the datasets stored thereon, a user can train prompts on a user computing device with limited computational power and with limited data. Typically, such user computing devices have constrained memory spaces that cannot be used to store large models and a large amount of training data.

The systems and methods disclosed herein can be utilized for prompt tuning for natural language processing tasks, computer vision tasks (e.g., the input to the model can be a prompt alongside an image, and the output can be an image classification and/or the location of objections in the image), audio processing tasks (e.g., he input to the model can be a prompt alongside an audio sample, and the output can be a classification of the audio sample), or a variety of other tasks. Prompt tuning for vision tasks can involve one or more of pad tuning, channel tuning, mask tuning, and/or prompt tuning for a vision transformer. For the prompt tuning, a set of inputs and a learnable prompt can be processed with one or more machine-learned models with a standard forward pass to generate a prediction. The prediction can then be compared against a respective label (e.g., a ground truth label for the respective inputs and prompt) in order to evaluate a loss function. The results of the loss function can be output after a backwards pass where only the prompt is updated.

For pad tuning, the learnable variable can be a border around the image (e.g., the learnable variable can be encoded in a strip of pixels of a fixed width running around the edge of the image). For channel tuning, the learnable variable can be another channel of the input. For example, the image may include three color channels and a prompt channel. For mask tuning, the learnable variable can be a mask that is applied to the input. Additionally and/or alternatively, prompt tuning for a vision transformer can involve unrolling the image into a sequence of patches (e.g., inputs) like in a vision transformer and can then apply prompt tuning to the sequence of patches.

The systems and methods disclosed herein can be used to generate one or more prompts for image-based tasks. The systems and methods can then be used for image processing. For example, the systems and methods can include obtaining an input image and a prompt. The prompt can be structured as at least one of a padding variable around the border of the input image, a channel variable for the input image, or a mask variable for the input image. In some implementations, the systems and methods can include processing the input image with a machine-learned model to generate a prediction. The prediction can be a generated classification (e.g., data indicative of a classification of the image into one of a plurality of classes, such as a probability distribution over classes), a generated image caption, a generated new image, a generated augmented image, a text document based on the input image, and/or object detection (e.g., the location of an object in the image that corresponds to the prompt). The systems and methods can include providing a prediction as an output. The prediction may be provided to a user computing device. In some implementations, the prediction can be provided as part of a user interface associated with application programming interface provided as part of a prompt model inference service.

The systems and methods disclosed herein can use a variety of machine-learned model architectures with a variety of sub-blocks. For example, the systems and methods can utilize a transformer for training and/or using the prompts. Moreover, the prompts can be used to complete a variety of different tasks for a variety of different fields of study or work.

Training a prompt can be trained with one or more training processes for training one or more parameters. In some implementations, a prompt can be trained similarly to training a machine-learned model. Moreover, in some implementations, a machine-learned model and the prompt can be trained simultaneously. Alternatively and/or additionally, the prompt can be trained as an extension of the machine-learned model.

In some implementations, systems and methods for training a prompt can include inputting a prompt into a machine-learned model to generate an output (e.g., the prompt can correspond to a question, and the output can be an answer.). The output can be analyzed, and the results of the analysis can be backpropagated. For example, the output can be assessed or evaluated to determine whether to modify one or more parameters of the prompt. In some implementations, one or more parameters of both the machine-learned model and the prompt may be adjusted in response to the evaluation of the output. Alternatively and/or additionally, the machine-learned model can be held fixed during the training of the prompt.

The systems and methods can include jointly training a prompt tuning model and a meta-prompt. Alternatively and/or additionally, the meta-prompt and the prompt tuning model may be trained separately. Training can involve obtaining a training example and a meta-prompt. The training example and the meta-prompt can be processed with a prompt tuning model to generate a task-specific prompt. The task-specific prompt and an example can be processed with the prompt tuning model or another machine-learned model to generate a prediction. The prediction can be assessed, and based on the assessment, one or more parameters of the prompt tuning model and/or the meta-prompt may be modified.

In some implementations, training can involve obtaining a training example. The training example can be processed with a prompt tuning model to generate a task-specific prompt. The task-specific prompt and an example can be processed with the prompt tuning model or another machine-learned model to generate a prediction. The prediction can be assessed, and based on the assessment, one or more parameters of the prompt tuning model may be modified. Assessing the prediction can involve evaluating a loss function by comparing the prediction to a label for the processed dataset.

Moreover, model inference can be completed with or without a meta-prompt. For example, a machine-learned model (e.g., a prompt tuning model) can process a prompt to generate a prediction. In some implementations, the machine-learned model may be fixed. A large frozen model may be utilized for leveraging a large quantity of data. In some implementations, the machine-learned model can process both a prompt and one or more examples in order to generate the prediction. Alternatively and/or additionally, the machine-learned model (e.g., a prompt tuning model) can process a meta-prompt and an example to generate a prediction. The machine-learned model can be configured to utilize the meta-prompt for generating a prompt, and the prompt can be processed to generate the prediction. The prediction can involve generated text data associated with a task, in which the text is generated based on the one or more examples and/or the one or more prompts. In some implementations, the prediction can include text data, audio data, image data, a classification, and/or latent encoding data.

The systems and methods of the present disclosure provide a number of technical effects and benefits. As one example, the system and methods can provide a semantic search that can allow for the determination and isolation of similar prompts to use for retraining or tuning. More specifically, the systems and methods can process an example dataset to generate a first prompt, the first prompt can be semantically searched to find one or more similar second prompts, and the second prompts can be used for retraining.

Another example technical effect and benefit relates to improved computational efficiency and improvements in the functioning of a computing system. For example, a technical benefit of the systems and methods of the present disclosure is the ability to generate meta-prompts, which can be used for generating new prompts. In some implementations, the generated meta-prompts can allow for localized prompt generation with a lessened computational cost. Similarly, prompt tuning with the prompt tuning training API can allow for a user to leverage a server computing system with a database of prompts to generate prompts even if the user has a computing device with limited computational resources.

Another example technical effect and technical benefit of the systems and methods can include the ability to generate and tune prompts for a variety of tasks including natural language processing tasks, computer vision tasks, and/or audio processing tasks. For example, the systems and methods disclosed herein can generate and tune prompts for computer vision using vision models. The use of pad tuning, channel tuning, and/or mask tuning can allow for visual prompts to be trained for data generation.

With reference now to the Figures, example embodiments of the present disclosure will be discussed in further detail.

Example Devices and Systems

FIG. 1A depicts a block diagram of an example computing system 100 that performs prompt tuning according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more prompt tuning models 120. For example, the prompt tuning models 120 can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. Example prompt tuning models 120 are discussed with reference to FIGS. 2-5, 10A-10B, 13A-13C, & 15. Alternatively and/or additionally, the user computing device 102 may store one or more prompts, which can be trained, generated, or refined using one or more machine-learned models 140 stored on the server computing system 130 or the training computing system 150.

In some implementations, the one or more prompt tuning models 120 can be received from the server computing system 130 over network 180, stored in the user computing device memory 114, and then used or otherwise implemented by the one or more processors 112. In some implementations, the user computing device 102 can implement multiple parallel instances of a single prompt tuning model 120 (e.g., to perform parallel prompt tuning across multiple instances of user-initiated prompt tuning).

More particularly, the prompt tuning model can be used to train and retrain prompts and/or meta-prompts. Moreover, in some implementations, the prompt tuning model can also be utilized for completing a task based on a prompt (e.g., a natural language processing task, a computer vision task, or an audio processing task). The prompt tuning model can be utilized to train a first prompt. The first prompt can be used to determine one or more second prompts that are associated with the first prompt. Data associated with the second prompt(s) can be processed with the prompt tuning model to retrain the first prompt in order to generate an augmented first prompt.

Alternatively and/or additionally, the prompt tuning model can be utilized to process a plurality of datasets and prompts to generate a meta-prompt. The meta-prompt can then be refined by processing aggregated examples and the meta-prompt with the prompt tuning model.

Additionally or alternatively, one or more prompt tuning models 140 can be included in or otherwise stored and implemented by the server computing system 130 that communicates with the user computing device 102 according to a client-server relationship. For example, the prompt tuning models 140 can be implemented by the server computing system 140 as a portion of a web service (e.g., a prompt tuning service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned prompt tuning models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5, 10A-10B, 13A-13C, & 15.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the prompt tuning models 120 and/or 140 based on a set of training data 162. The training data 162 can include, for example, training datasets, which can include a training example, a training label, and a training prompt.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be tabular data (e.g., data from a spreadsheet). The machine-learned model(s) can process the tabular data to generate an output. As an example, the machine-learned model(s) can process the tabular data to generate a recognition output. As another example, the machine-learned model(s) can process the tabular data to generate a prediction output. As another example, the machine-learned model(s) can process the tabular data to generate a classification output. As another example, the machine-learned model(s) can process the tabular data to generate a segmentation output. As another example, the machine-learned model(s) can process the tabular data to generate a segmentation output. As another example, the machine-learned model(s) can process the tabular data to generate a visualization output. As another example, the machine-learned model(s) can process the tabular data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task can include a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, the input can include multimodal data. The machine-learned model(s) can be trained to process the multimodal data to provide a variety of different outputs (e.g., a classification output, a diagnostic output, a prediction output, a latent space output, a multimedia output, etc.). For example, in some implementations, the multimodal input can include image data (e.g., one or more images) and text data (e.g., data descriptive of a question). The machine-learned model(s) can process the input and generate an answer to a question about the image.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
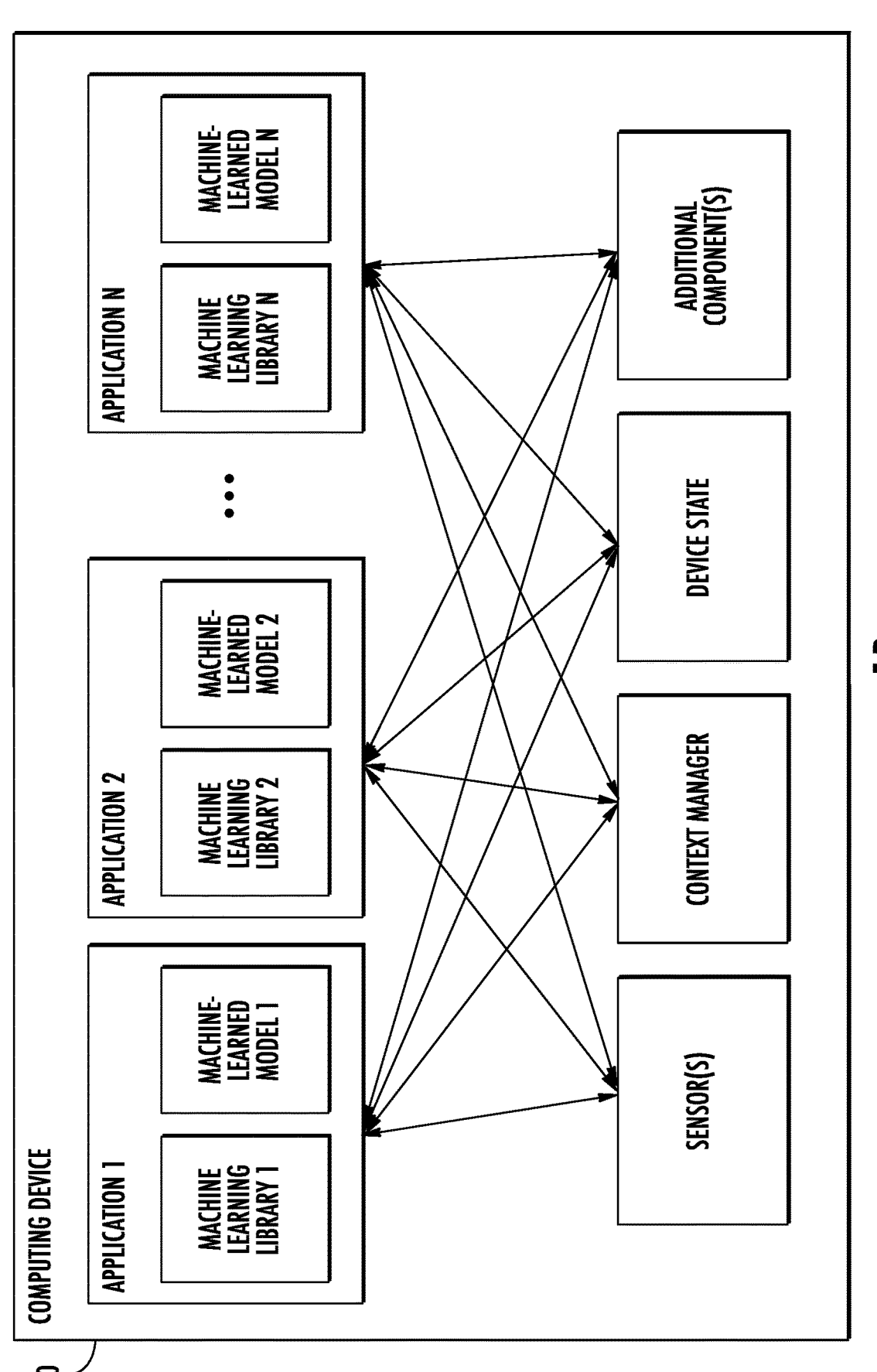
FIG. 1B depicts a block diagram of an example computing device that performs prompt tuning according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
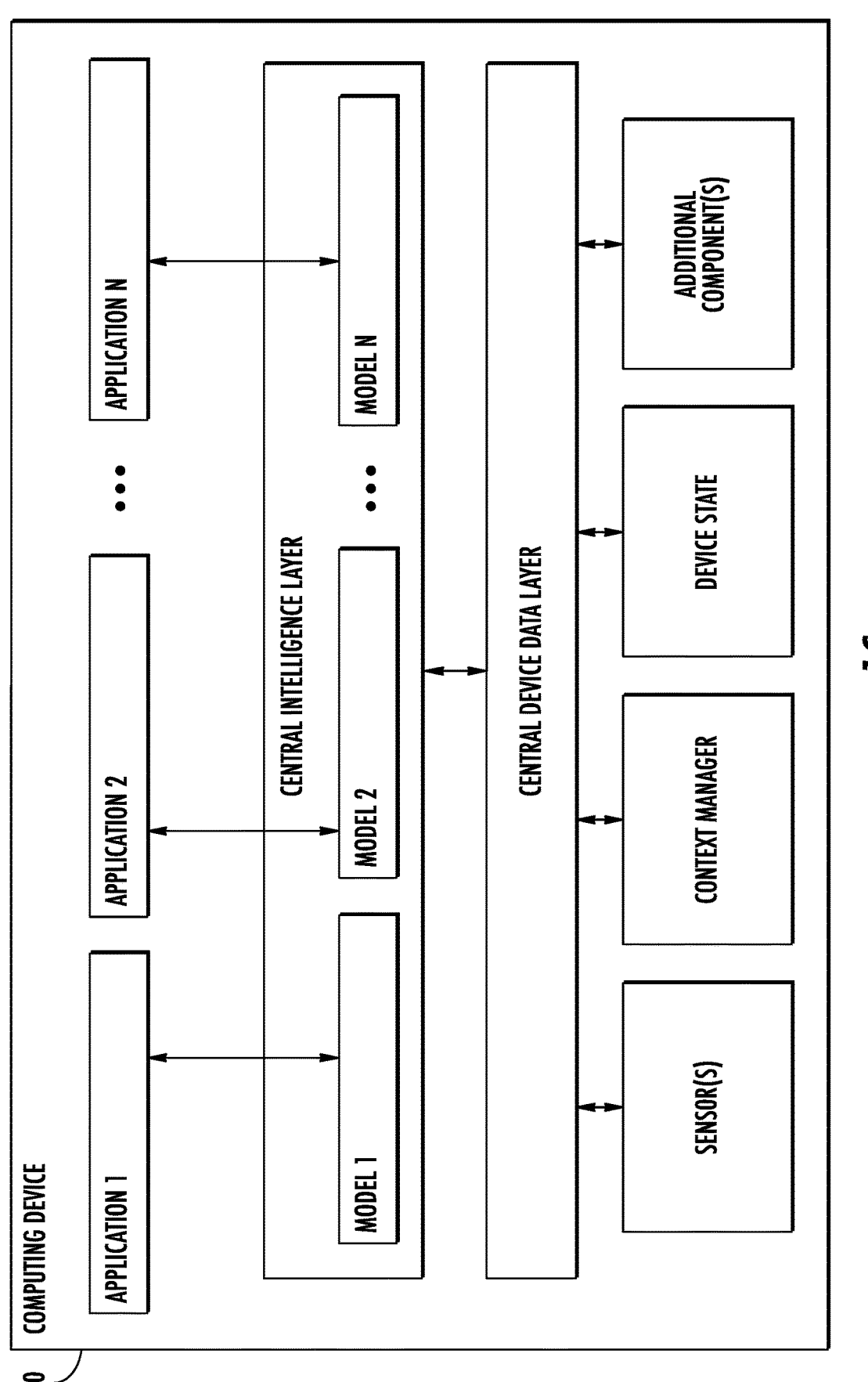
FIG. 1C depicts a block diagram of an example computing device that performs prompt tuning according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
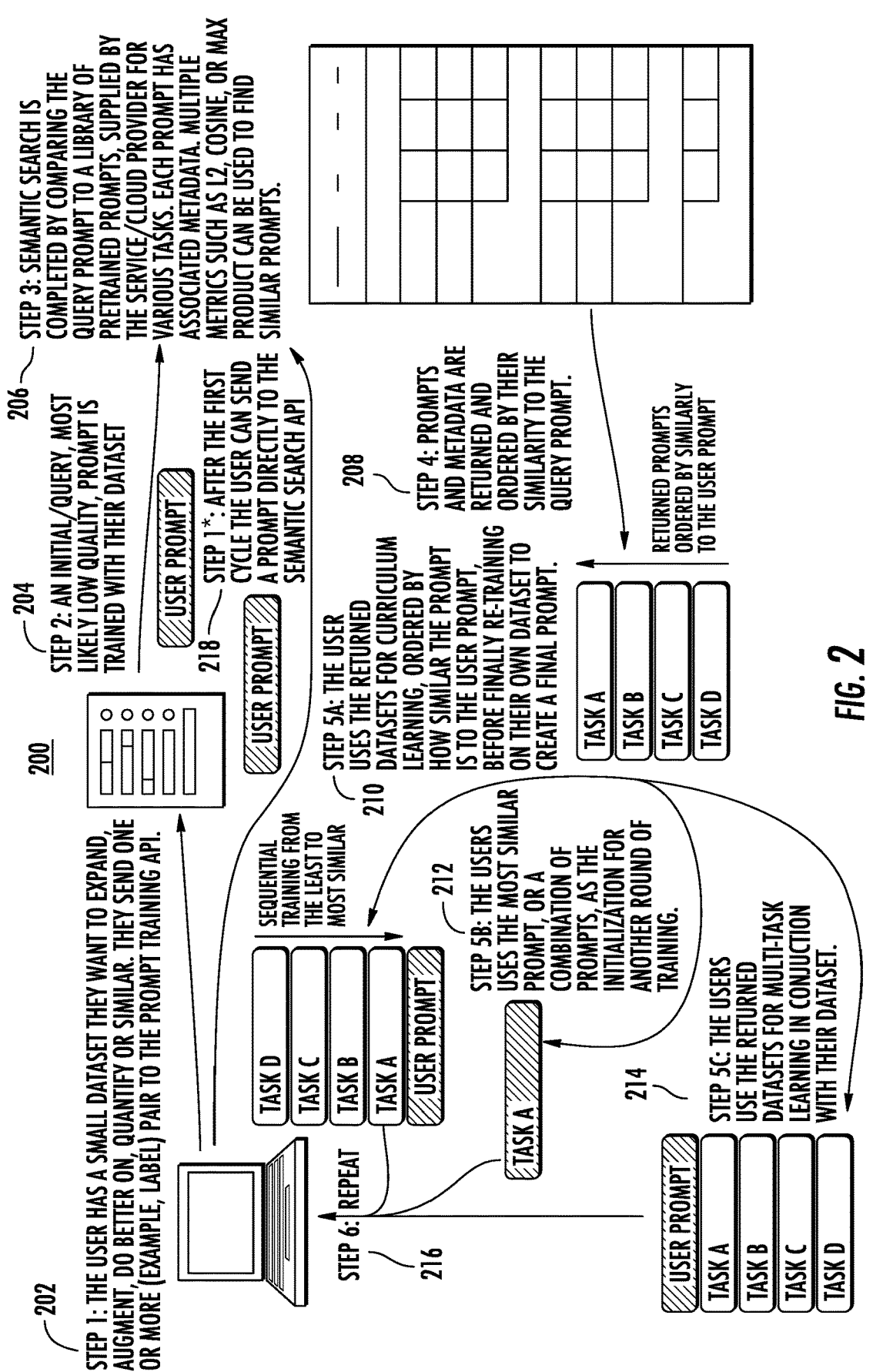
FIG. 2 depicts a block diagram of an example prompt tuning with semantic search process according to example embodiments of the present disclosure.

FIG. 2 depicts a block diagram of an example prompt tuning system 200 according to example embodiments of the present disclosure. In some implementations, the prompt tuning system 200 is trained to receive a set of input data descriptive of examples and respective labels for the examples and, as a result of receipt of the input data, provide output data that can include an augmented first prompt. Thus, in some implementations, the prompt tuning system 200 can include prompt generation and prompt retraining.

The prompt tuning system 200 of FIG. 2 can include semantic searching to determine one or more second prompts are associated with the first prompt, which can then be used for retraining. The system 200 can begin with a user having an example dataset. The example dataset can include an example and a respective label. The example dataset can be input into a machine-learned model 202 in order to train a first prompt (e.g., an initial prompt or a query prompt) 204. In some implementations, the machine-learned model can include a prompt tuning model of a prompt tuning training API. The first prompt can then be used to determine one or more second prompts 206, in which the second prompts are associated with the first prompt. The determination process 206 can include a semantic search that compares the first prompt to a library of pretrained prompts. Each prompt can have associated metadata. Metrics for determining similarity can include L2, cosine, or max product. The one or more second prompts and their respective metadata can then be ordered based on their similarity with the first prompt (e.g., initial prompt or query prompt) 208. The ordered second prompts and the respective metadata can then be utilized in one of a variety of ways for generating an augmented first prompt. One possible technique can involve using the returned datasets for curriculum learning 210, ordered by how similar the second prompt is to the first prompt, before retraining on the example dataset in order to generate the augmented first prompt. Another technique can involve using the most similar second prompt, or a combination of the most similar second prompts, as the initialization for another round of training 212. Another technique can involve using the returned datasets for multi-task learning in conjunction with their dataset 214. Each technique can cause the first prompt to be updated. The process can then be repeated 216. After the first cycle, the augmented first prompt can be the beginning input for the semantic search API 218.

Figure 3:
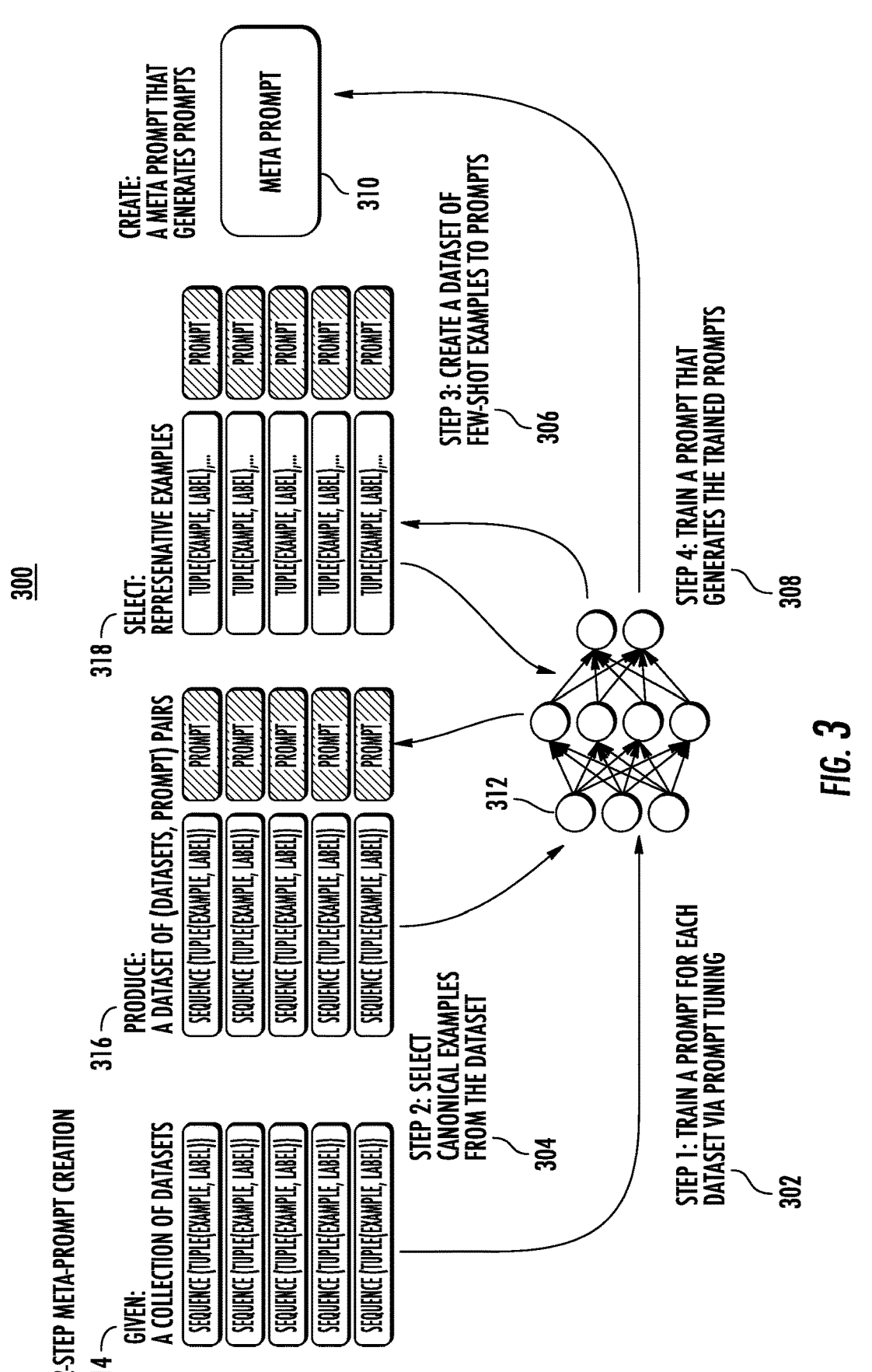
FIG. 3 depicts a block diagram of an example prompt generation model according to example embodiments of the present disclosure.

FIG. 3 depicts a block diagram of an example prompt generation model 300 according to example embodiments of the present disclosure. In some implementations, the prompt generation model 300 can include a prompt tuning model for processing datasets 314 and prompts 316 for training one or more parameters of a prompt or a meta-prompt 310.

The process can begin with a collection of datasets 314. The collection of datasets can be input into the prompt tuning model 312 to train a prompt for each dataset 302. The resulting dataset and prompt pairs 316 can be processed to determine or select one or more canonical examples from the datasets 304. The representative examples 318 can then be used to generate a dataset of few-shot examples (e.g., an example dataset) for the prompts 306. The few-shot examples can then be processed by the prompt tuning model 312 in order to train a prompt that generates the trained prompts (e.g., a meta-prompt 310) 308.

In some implementations, a machine-learned model can be prompt-tuned to generate prompts. Alternatively and/or additionally, a meta-prompt can be used.

Figure 4:
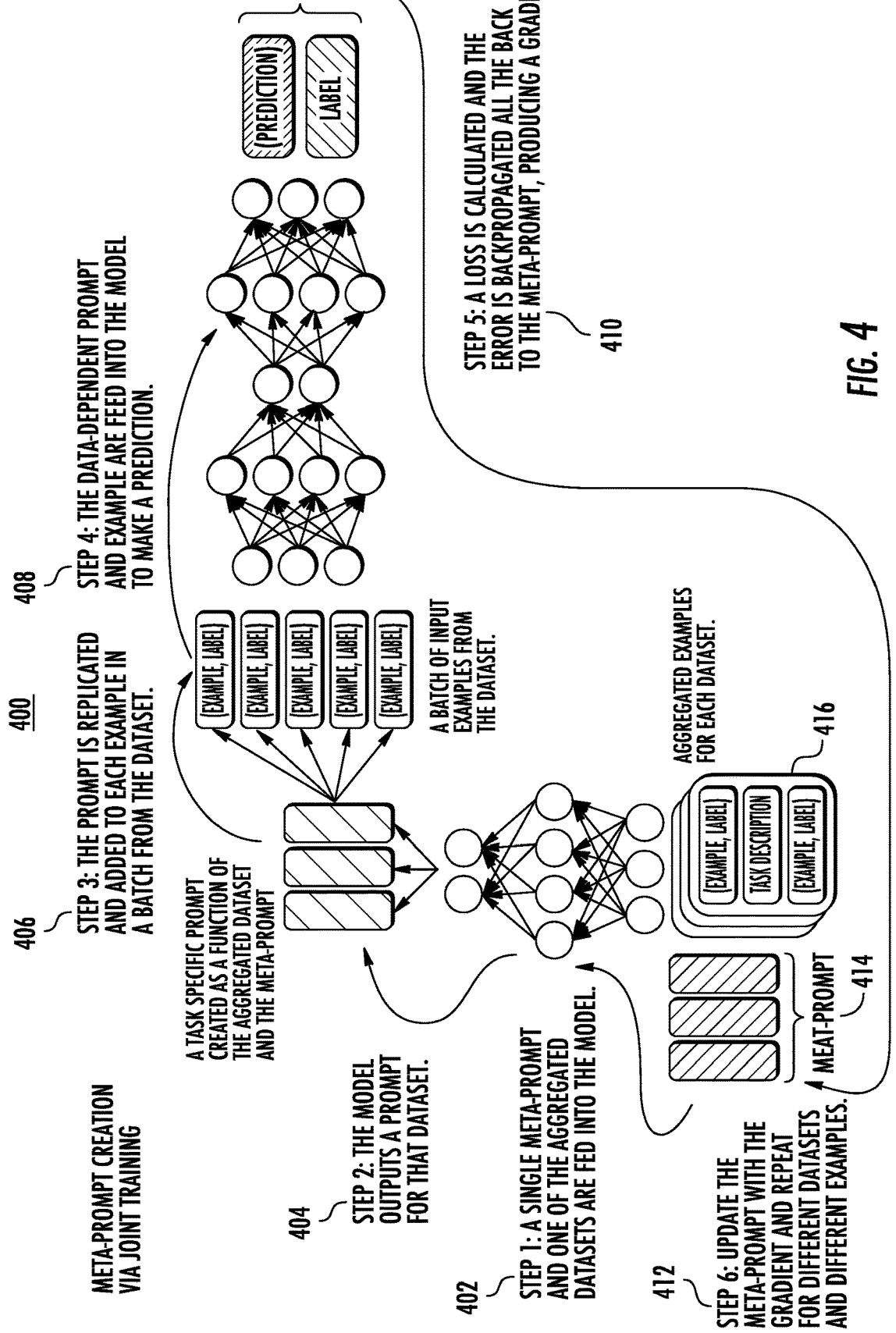
FIG. 4 depicts a block diagram of an example meta-prompt training model according to example embodiments of the present disclosure.

FIG. 4 depicts a block diagram of an example meta-prompt training model 400. A meta-prompt 414 can be trained or retrained based at least in part on aggregated examples 416 for a plurality of datasets. The aggregated examples 416 can include a task description or an example and label pair (e.g., the example and label pair can include multimodal data, which may include image data and text data, such that a prompt is being trained to answer a question about an image.). The meta-prompt 414 and one of the aggregated datasets 416 can be input into a machine-learned model 402. The output of the machine-learned model can include a prompt for the aggregated dataset 404. The prompt can be a task-specific prompt generated as a function of the aggregated dataset 416 and the meta-prompt 414.

The prompt can then be replicated and can be added to each example in a batch from the dataset 406. Next, the prompt and an example can be input into a machine-learned model to generate a prediction. The prediction can then be compared against the label for the example in order to evaluate a loss. The loss can be calculated, and the error can be backpropagated all the way back to the meta-prompt 414 to produce a gradient 410. The gradient can then be used to update the meta-prompt 414. The process can be repeated for different datasets with different examples 412. In some implementations, a task description and a task can be processed to generate the gradient.

Figure 5:
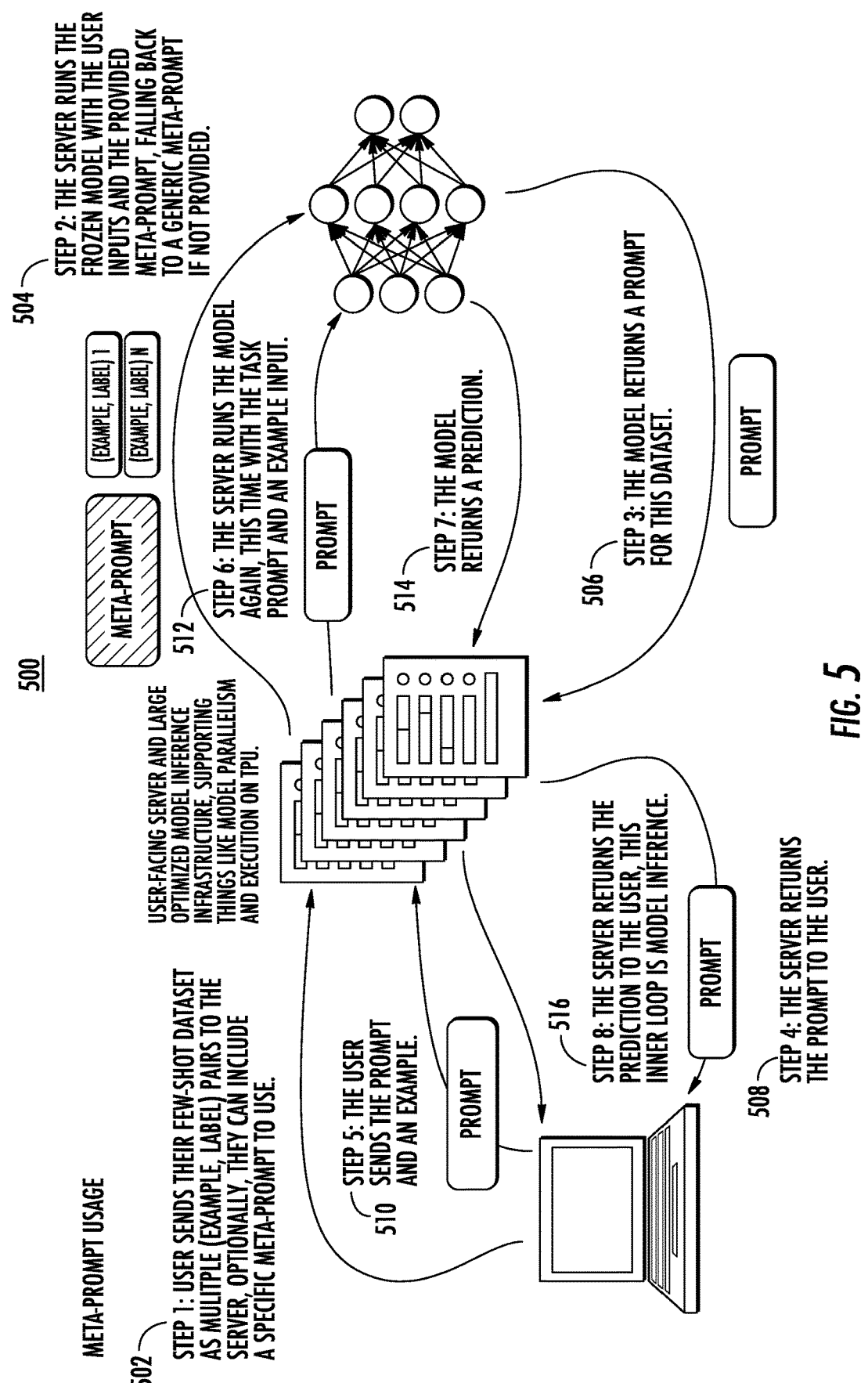
FIG. 5 depicts a block diagram of an example meta-prompt usage process according to example embodiments of the present disclosure.

FIG. 5 depicts a block diagram of an example meta-prompt usage process 500. Meta-prompt usage can begin with a user sending example datasets (e.g., example and label pairs) to a server computing system 502. In some implementations, the example datasets may include a specific meta-prompt to use. The server computing system can input the example datasets and the meta-prompt into a frozen model 504. A generic meta-prompt may be used if a specific meta-prompt is not selected.

The frozen model can then return a prompt for the dataset as an output 506. The server computing system can then send the prompt to the user (e.g., sending over a network to a user computing device) 508. In some implementations, the prompt can be sent with an example back to the server computing system 510. The server computing system can then run the model again with task prompt and the example input 512. In response to the prompt and example input, the model can output a prediction 514. The server computing system can then return the prediction to the user 516.

The prompt and example input to output the prediction can be the model inference.

In some implementations, the server computing system can include a large optimized model inference infrastructure that can support model parallelism and execution on TPU.

Figure 10A:
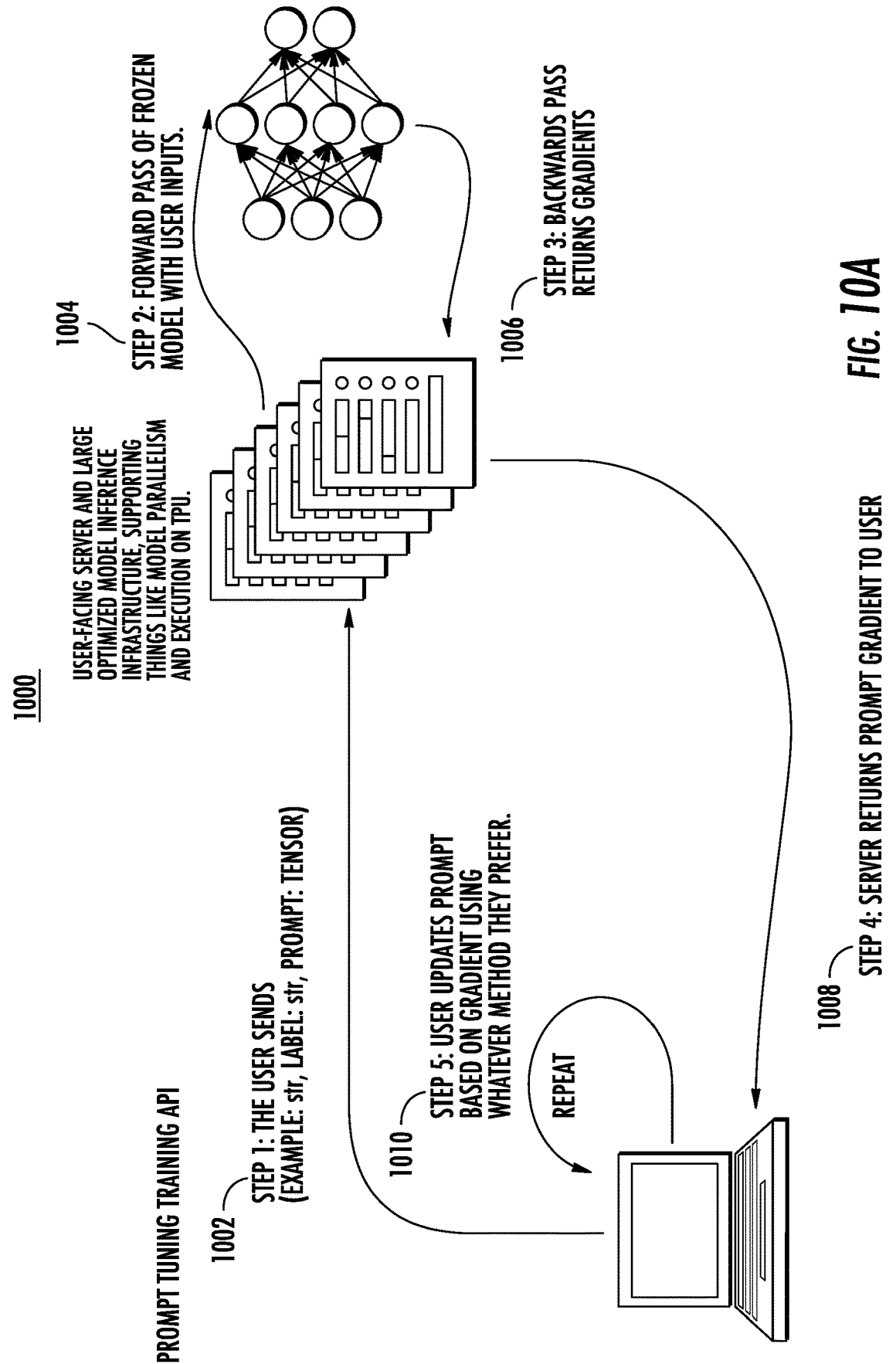
FIG. 10A depicts a block diagram of an example prompt tuning training API according to example embodiments of the present disclosure.

FIG. 10A depicts a block diagram of an example prompt tuning training API 1000 according to example implementations of the present disclosure. The prompt tuning training API 1000 can train a prompt based on a set of user inputs. More specifically, the prompt tuning training API 1000 can receive an example, a label, and a prompt from a user 1002. The prompt tuning training API 1000 can run the inputs through a forward pass of a frozen model 1004. The output of the forward pass can be run through the frozen model with a backwards pass to generate a gradient 1006. The gradient can then be sent back to the user (e.g., sending the gradient to a user computing device via a network connection) 1008. The prompt can then be updated based on the gradient 1010. The updating can occur automatically or in response to one or more user-inputs. The process can be repeated iteratively. Such a process can allow for prompts to be trained on a user computing device with limited computational resources.

FIG. 10B depicts a block diagram of an example prompt tuning multi-task training API 1050 according to example implementations of the present disclosure. For example, the prompt tuning training API 1000 of FIG. 10A can be configured for multi-task training. The prompt tuning multi-task training API 1050 can be configured to train or retrain both a general prompt and a task-specific prompt.

First, a general prompt and a task-specific prompt can be combined 1054. The combined prompt can then be sent to the prompt tuning multi-task training API along with an example and a label 1002. Similar to the process depicted in FIG. 10A, the example, the prompt (e.g., the combined prompt) can be processed with the frozen model with a forward pass 1004 and a backwards pass in order to generate one or more prompt gradients 1006. The prompt gradients can then be sent back to the user 1008. The user computing device and/or the user can compute individual gradients for the shared prompt (e.g., the general prompt) and the task-specific prompt based on the combined prompt 1052. The determined shared gradients and the task-specific gradients can then be used to update the general prompt and the task-specific prompt.

Figure 13A:
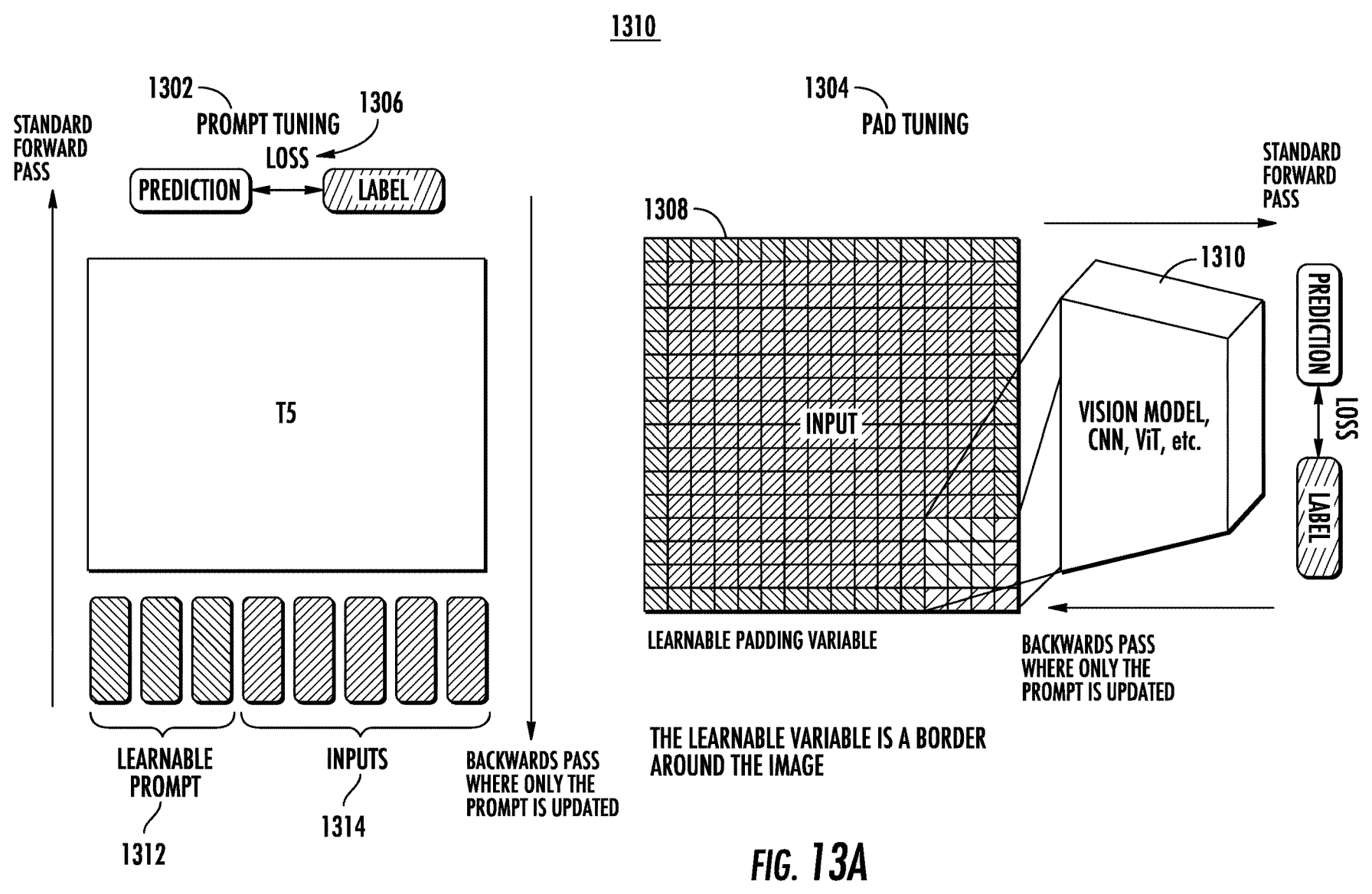
Figure 13B:
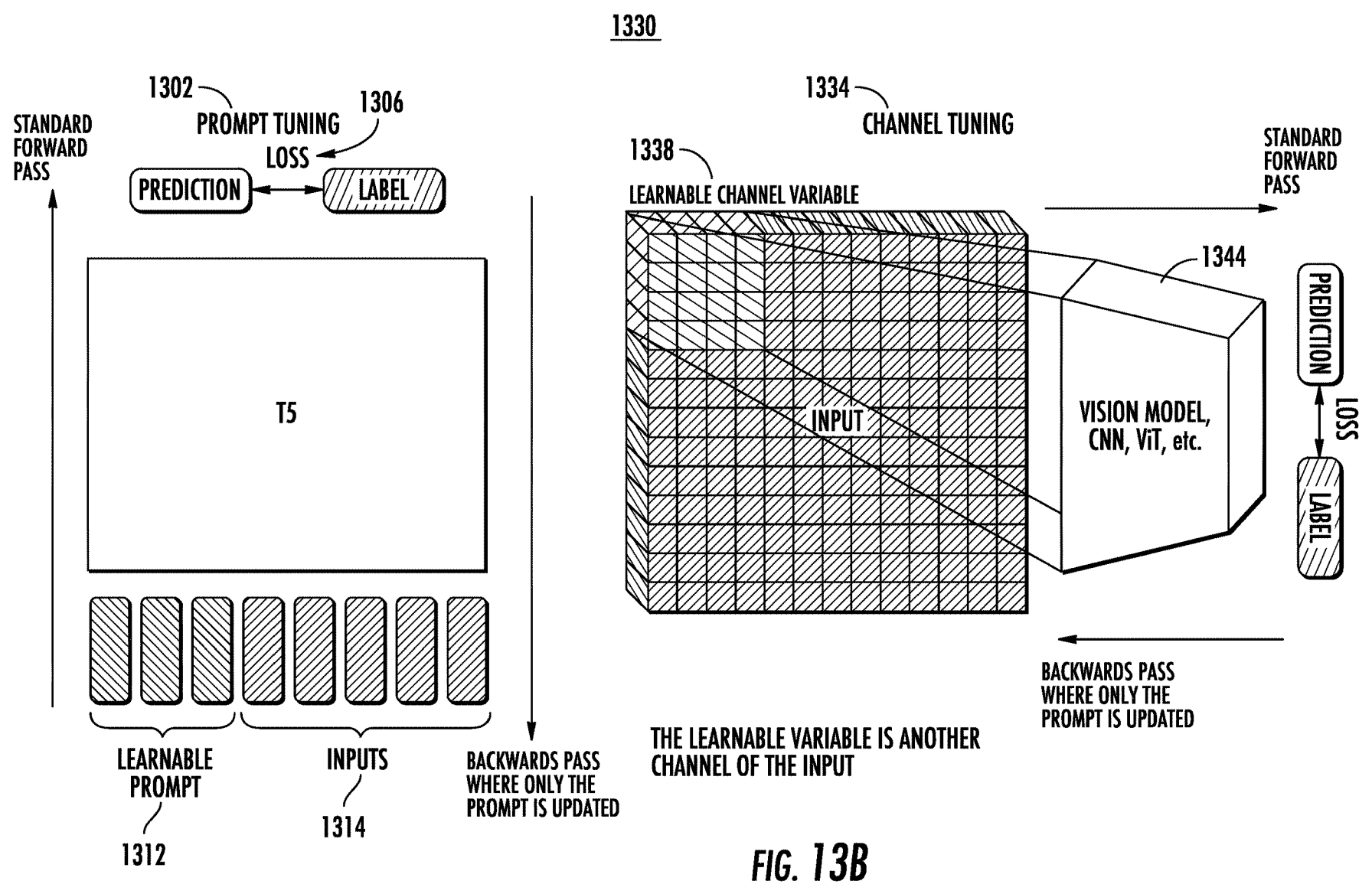
Figure 13C:
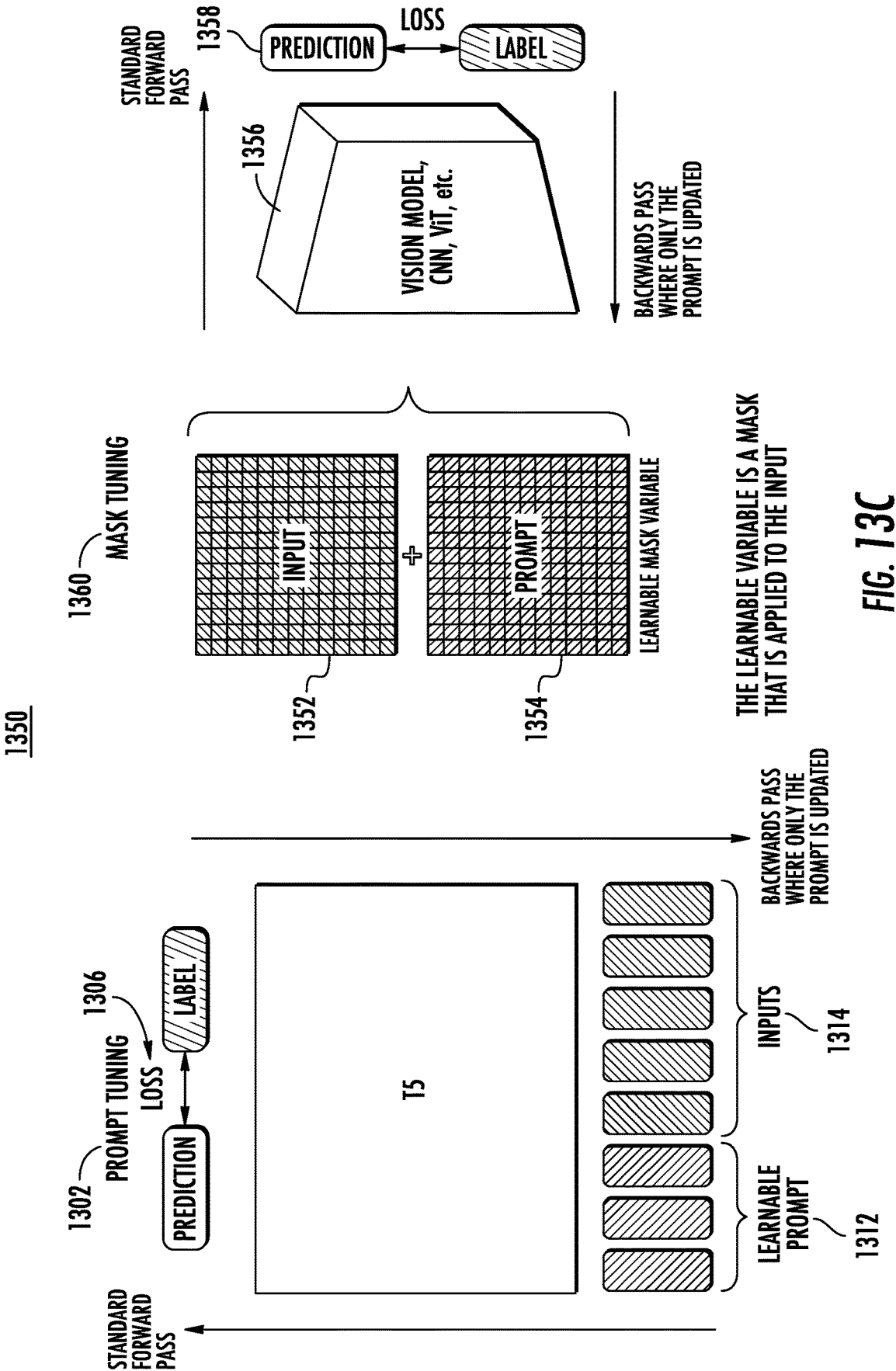
FIG. 13C depicts a block diagram of an example mask tuning model according to example embodiments of the present disclosure.

FIGS. 13A-13C depict example processes for training visual prompts. The processes can be implemented in tandem with the other prompt tuning processes disclosed herein. Each of the processes can involve a prompt tuning training process that can begin with a learnable prompt 1312 and one or more inputs 1314 being input into a prompt tuning model. The result of a standard forward pass can be a prediction. The prediction can then be compared against a respective label for the prompt and inputs in order to evaluate a loss function 1306. The evaluation of the loss function can be used to generate a prompt gradient. Moreover, a backwards pass can update the prompt based on the prompt gradient.

FIG. 13A depicts a block diagram of an example pad tuning model 1310 according to example implementations of the present disclosure. The pad tuning 1304 can involve inputting an input with a learnable padding variable 1308 into a vision model (e.g., a CNN model, ViT model, etc.) 1310. A forward pass of the vision model 1310 can output a prediction, which can be compared to a ground truth label in order to evaluate a loss function. A backwards pass of the evaluation of the loss function through the vision model 1310 can generate a gradient to update one or more parameters of the visual prompt.

FIG. 13B depicts a block diagram of an example channel tuning model 1330 according to example implementations of the present disclosure. The channel tuning 1334 can involve inputting an input with a learnable channel variable 1338 into a vision model (e.g., a CNN model, ViT model, etc.) 1344. A forward pass of the vision model 1344 can output a prediction, which can be compared to a ground truth label in order to evaluate a loss function. A backwards pass of the evaluation of the loss function through the vision model 1344 can generate a gradient to update one or more parameters of the visual prompt.

FIG. 13C depicts a block diagram of an example mask tuning model 1350 according to example implementations of the present disclosure. The channel tuning 1360 can involve inputting an input 1352 and a prompt (i.e., a learnable mask variable) 1354 into a vision model (e.g., a CNN model, ViT model, etc.) 1356. A forward pass of the vision model 1356 can output a prediction 1358, which can be compared to a ground truth label in order to evaluate a loss function. A backwards pass of the evaluation of the loss function through the vision model 1356 can generate a gradient to update one or more parameters of the visual prompt. In some implementations, mask tuning 1360 can include mask segmentation and/or masking portions of the input 1352 with the prompt 1354.

Figure 15:
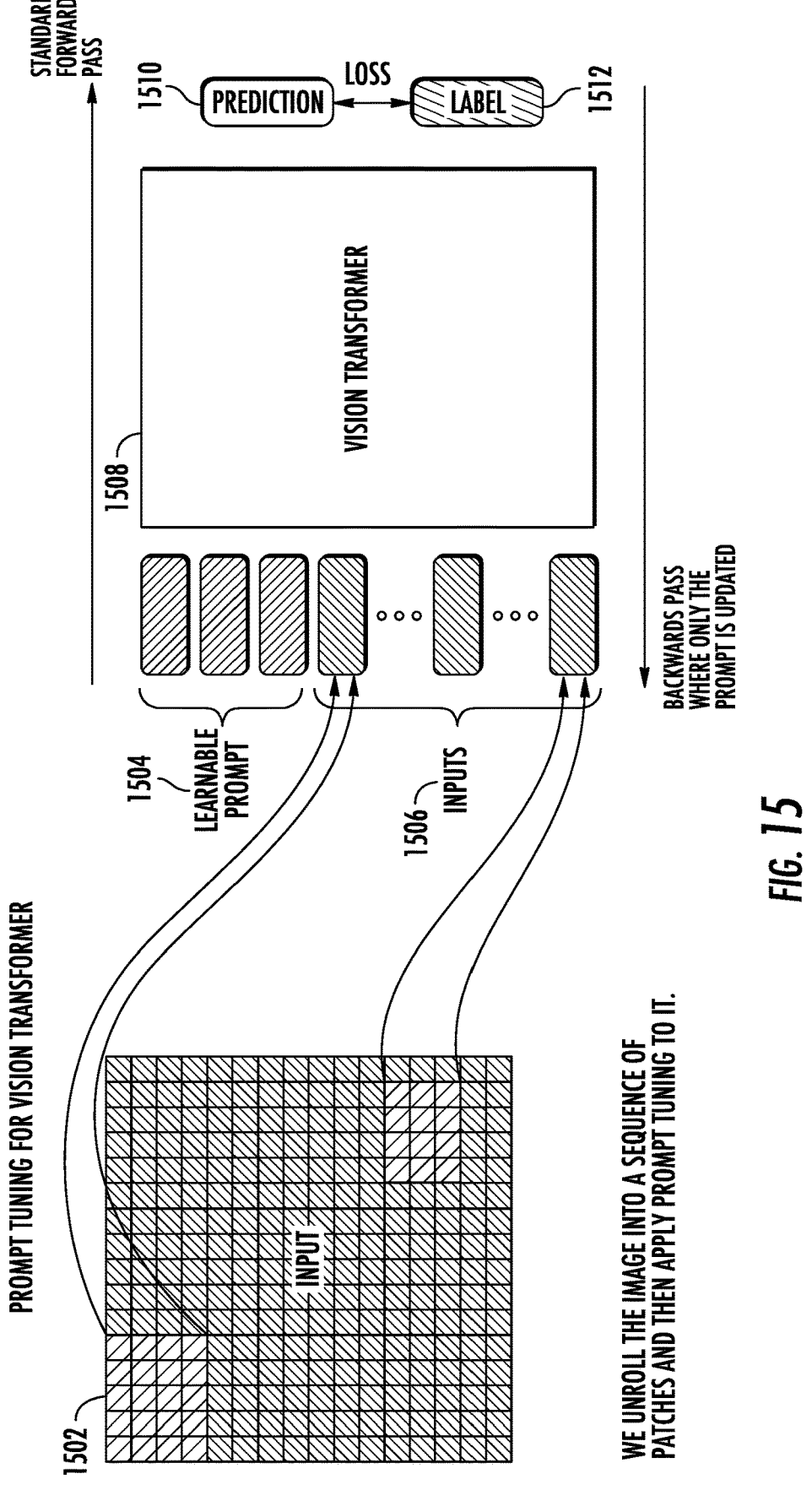
FIG. 15 depicts a block diagram of an example prompt tuning for a vision transformer process according to example embodiments of the present disclosure.

FIG. 15 depicts a block diagram of an example prompt tuning for a vision transformer process 1500 according to example implementations of the present disclosure. In some implementations, prompt tuning for visual prompts can involve unrolling an image into a sequence of patches, similar to in a vision transformer and then applying the prompt tuning to it. Additionally and/or alternatively, the input 1502 can be separated into sections 1506 for input into a vision transformer 1508. The input sections 1506 and a learnable prompt 1504 can be input into the vision model 1508 in order to generate an updated prompt (e.g., an augmented prompt).

A forward pass of the vision transformer 1508 with the input sections 1506 and the learnable prompt 1504 can generate a prediction 1510. The prediction 1510 and a label 1512 for the respective input can be compared in order to evaluate a loss function. The output of the loss function can then be processed with the vision transformer 1508 with a backwards pass in order to update the prompt.

Example Methods

Figure 6:
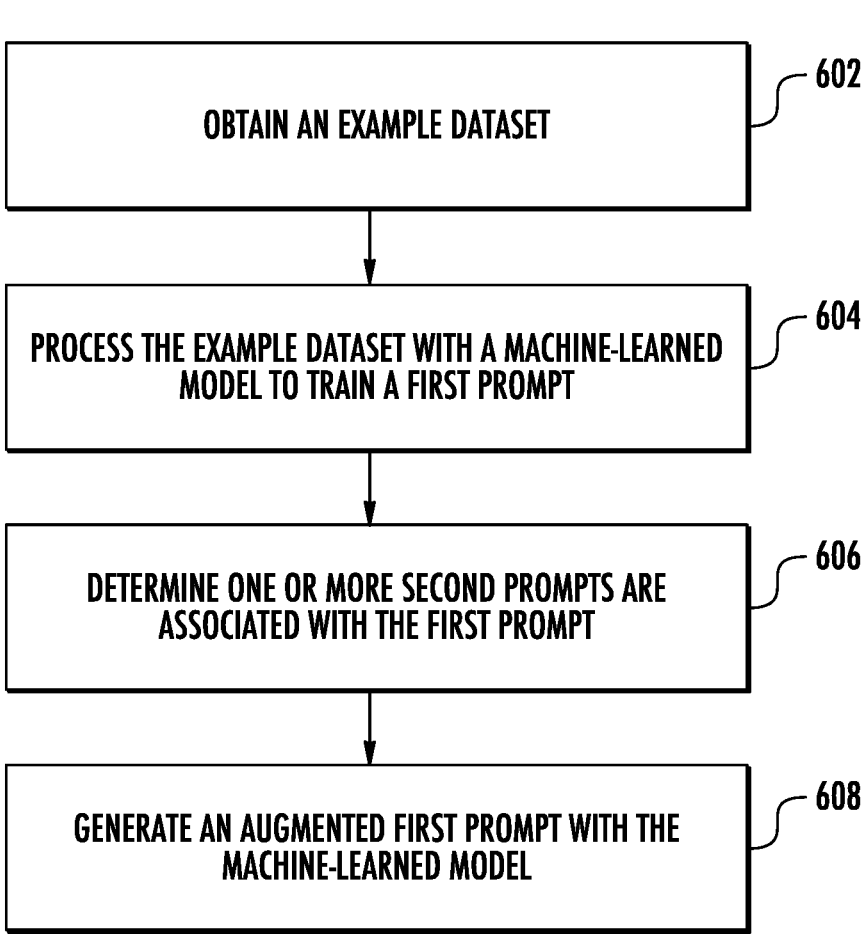
FIG. 6 depicts a flow chart diagram of an example method to perform prompt tuning with semantic search according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain an example dataset. The example dataset can include examples related to or associated with one or more tasks. In some implementations, the example dataset can include text data, image data, and/or audio data.

At 604, the computing system can process the example dataset with a machine-learned model to train a first prompt. The first prompt can be representative of a first task associated with the example dataset.

At 606, the computing system can determine one or more second prompts are associated with the first prompt. The one or more second prompts can be obtained from a library of pretrained prompts and/or a database of prompts generated based on other datasets. In some implementations, the one or more second prompts can be determined based on a similarity score between the first prompt and the second prompts. The similarity score can be based on a variety of metrics.

At 608, the computing system can generate an augmented first prompt with the machine-learned model. The augmented first prompt can be generated based on the one or more second prompts. For example, metadata associated with the one or more second prompts may be input into the machine-learned model in order to retrain or update the first prompt. The augmented first prompt may be generated based on curriculum learning, multi-task learning, and/or training with the second prompt datasets and the example dataset in combination.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain an example dataset and process the example dataset with a machine-learned model to train a first prompt. The example dataset can be a user generated dataset. In some implementations, the machine-learned model can include a prompt tuning model, and the prompt tuning model may be a prompt tuning model of a prompt tuning training API. The first prompt may be trained to generate data associated with the example dataset.

At 704, the computing system can determine one or more second prompts are associated with the first prompt. The one or more second prompts can be determined via a semantic search. Alternatively and/or additionally, the one or more second prompts may be determined based on a classification head of a machine-learned model. The one or more second prompts may be ordered based on a similarity with the first prompt.

At 706, the computing system can retrain the first prompt with curriculum learning. Curriculum learning can involve using datasets associated with second prompts and training based on the similarity order of the second prompts. In some implementations, the example dataset can be used for retraining after training with the second prompt datasets.

At 708, the computing system can retrain the first prompt with one or more second prompts with a highest similarity score. The most similar second prompt or a combination of the most similar second prompts can be used as the initialization for another round of training.

At 710, the computing system can retrain the first prompt with multi-task learning. Multi-task learning can include using the second prompt datasets in conjunction with the example dataset for training the prompt for multiple tasks.

At 712, the computing system can generate an augmented first prompt with the machine-learned model. The augmented first prompt can be generated based on the one or more second prompts and may be generated based on curriculum learning, multi-task learning, and/or retraining with the first prompt and the one or more second prompts.

Figure 8:
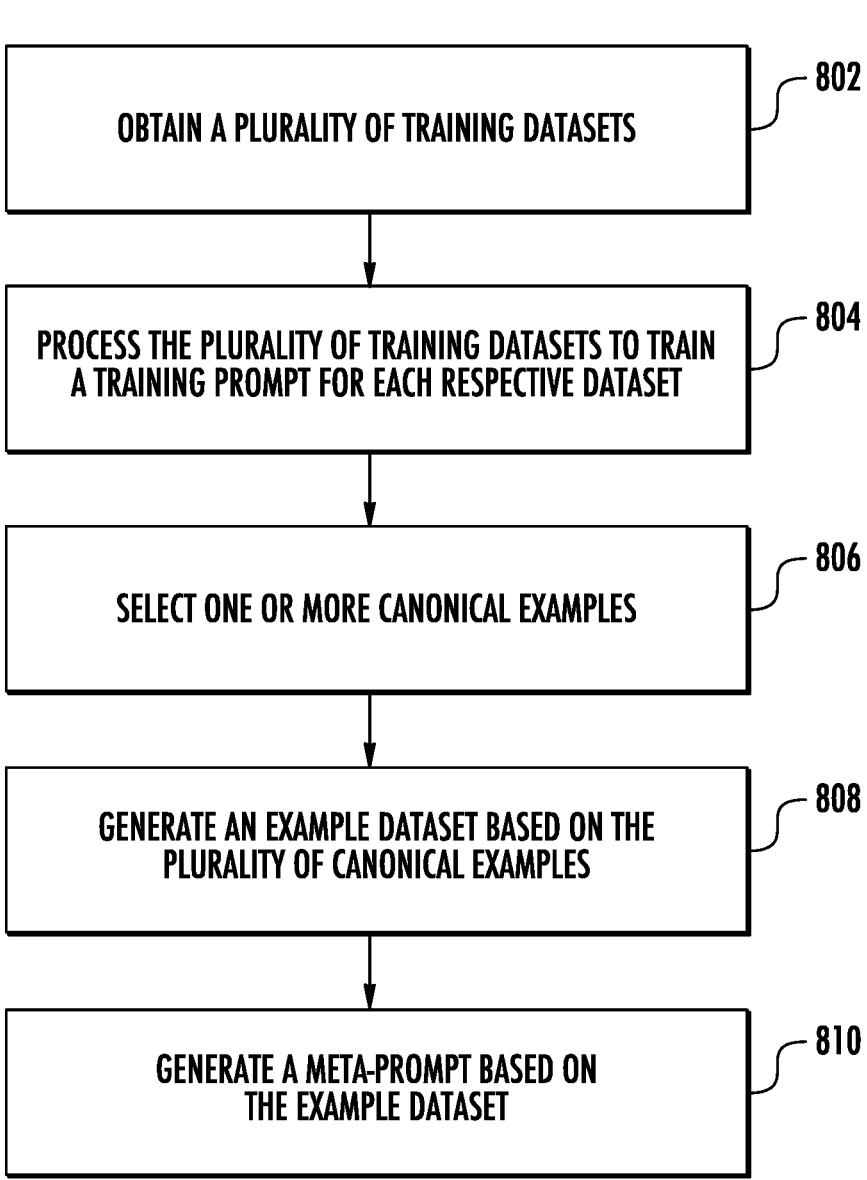
FIG. 8 depicts a flow chart diagram of an example method to perform meta-prompt generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of training datasets. Each training dataset can include an example and a label. The label may be descriptive of a task associated with the example. In some implementations, the label can include a classification of the examples in a dataset.

At 804, the computing system can process the plurality of training datasets to train a training prompt for each respective dataset. The training prompts can be associated with a task representative of the respective training dataset.

At 806, the computing system can select one or more canonical examples. The one or more canonical examples can be selected by a user or may be selected by one or more automated processes. The canonical examples can be representative examples of the training dataset associated with a respective prompt. In some implementations, one or more canonical examples can be selected for each respective prompt.

At 808, the computing system can generate an example dataset based on the plurality of canonical examples. The example dataset can be organized as canonical example(s) and prompt pairs.

At 810, the computing system can generate a meta-prompt based on the example dataset. The meta-prompt can be trained and configured to generate one or more new prompts based on input datasets.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can obtain a meta-prompt and an aggregated dataset including an aggregated example and an aggregated label. In some implementations, the aggregated example can include a task description.

At 904, the computing system can process the meta-prompt and the aggregated dataset with a machine-learned model to generate a predicted prompt. The machine-learned model can include a prompt tuning model and may output a task-specific predicted prompt.

At 906, the computing system can process the predicted prompt and the aggregated example to generate a prediction. The prediction can be generated via a forward pass of a machine-learned model.

At 908, the computing system can evaluate a loss function that evaluates a difference between the prediction and the aggregated label. The loss function can be a meta-prompt tuning loss function and may output a gradient for updating the meta-prompt.

At 910, the computing system can adjust one or more parameters of the meta-prompt based at least in part on the loss function. The adjustments can be completed in response to a backwards pass of the machine-learned model. The adjustments can be based on the gradient.

Figure 11:
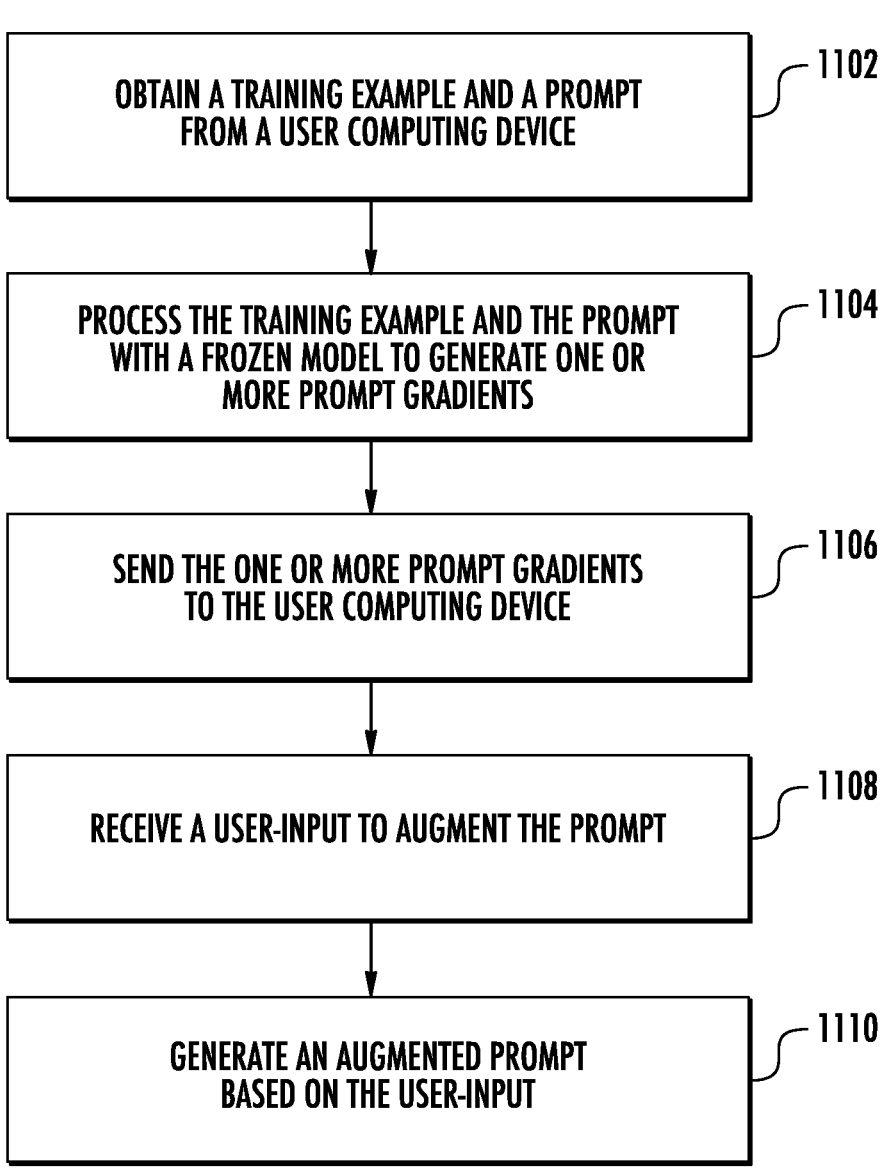
FIG. 11 depicts a flow chart diagram of an example method to perform prompt tuning with a prompt tuning training API according to example embodiments of the present disclosure.

FIG. 11 depicts a flow chart diagram of an example method to perform according to example embodiments of the present disclosure. Although FIG. 11 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure.

At 1102, a computing system can obtain a training example and a prompt from a user computing device. The training example (e.g., an example and a label) and the prompt can be obtained from a user computing device. In some implementations, the prompt can be generated with a prompt tuning model based on the example. The example and the label can be associated with the prompt, and the prompt can be representative of a task associated with the example.

At 1104, the computing system can process the training example and the prompt with a frozen model to generate one or more prompt gradients. The prompt gradients can be generated based on a prediction generated based on a forward pass with the frozen model. The gradient can be generated based on a backwards pass of the frozen model.

At 1106, the computing system can send the one or more prompt gradients to the user computing device. The prompt gradients can be sent via a user interface of a prompt tuning training API. Alternatively and/or additionally, the prompt gradients can be sent via a wireless network to the user computing device.

At 1108, the computing system can receive a user-input to augment the prompt. The user-input may be a manual adjustment of prompt parameters or may be the selection of an automated update feature of the prompt tuning training API.

At 1110, the computing system can generate an augmented prompt based on the user-input. The augmented prompt can be generated by adjusting one or more parameters of the prompt based on the user-input.

FIG. 12 depicts a flow chart diagram of an example method to perform according to example embodiments of the present disclosure. Although FIG. 12 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

At 1202, a computing system can obtain a general prompt and a plurality of task-specific prompts. A general prompt can be trained to complete a task shared between a plurality of prompts. Moreover, the task-specific prompt can be specifically trained for a specific task.

At 1204, the computing system can generate a combined prompt based on the general prompt and a particular task-specific prompt from the plurality of task-specific prompts. The combination can be completed via concatenation and/or one or more machine-learned models.

At 1206, the computing system can send the combined prompt to a server computing system. The server computing system can include a prompt tuning training API. In some implementations, the server computing system can store a large optimized model inference structure.

At 1208, the computing system can receive a combined prompt gradient from the server computing system. The combined prompt gradient can be generated by a prompt tuning model. The prompt tuning model can generate the prompt gradients based on a comparison between a determined prediction and the respective label for the examples and the prompts.

At 1210, the computing system can determine a general prompt gradient and a task-specific gradient based on the combined prompt gradient. In some implementations, the general prompt gradient and the task-specific prompt gradient may be automatically calculated or may be manually calculated by a user.

At 1212, the computing system can adjust one or more parameters of at least one of the general prompt or the task-specific prompt. The adjustments can be made based at least in part on the calculated general prompt gradient and/or the task-specific prompt gradient.

FIG. 14 depicts a flow chart diagram of an example method to perform according to example embodiments of the present disclosure. Although FIG. 14 depicts steps performed in a particular order for purposes of illustration and discussion, the methods of the present disclosure are not limited to the particularly illustrated order or arrangement. The various steps of the method 1400 can be omitted, rearranged, combined, and/or adapted in various ways without deviating from the scope of the present disclosure.

At 1402, a computing system can obtain a visual input and a respective label. In some implementations, the visual input can include one or more images. The respective label can be associated with a task. In some implementations, the label can include an image classification (e.g., object recognition).

At 1404, the computing system can generate a visual prompt with a visual prompt model. The visual prompt model can include a vision model (e.g., a vision model with one or more convolutional sub-blocks). In some implementations, the visual prompt model can include a vision transformer and/or a prompt tuning model. The visual prompt may be generated by processing visual datasets, which can include the visual input, with a visual prompt model.

At 1406, the computing system can generate visual-prompt data based on the visual prompt and the visual input. The visual-prompt data can include data associated with combining the visual prompt and the visual input.

At 1408, the computing system can process the visual-prompt data with a vision model to generate a prediction. The prediction can be task-specific prediction associated with the visual prompt.

At 1410, the computing system can evaluate a visual loss function based on a difference between the prediction and the respective label.

At 1412, the computing system can adjust one or more parameters of the visual prompt model based on the visual loss function.

Figure 16:
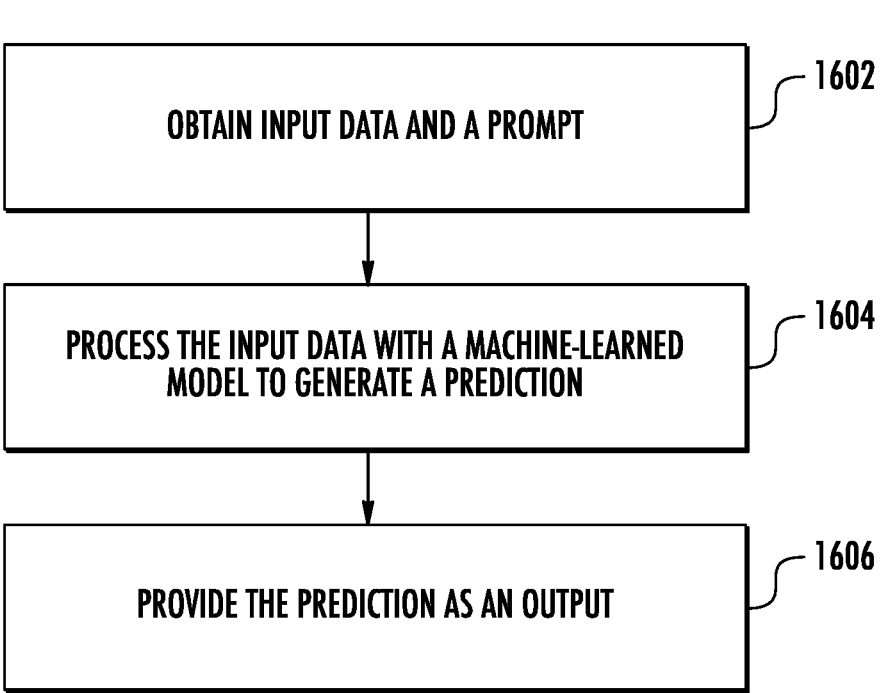
FIG. 16 depicts a flow chart diagram of an example method to perform prompt model inference according to example embodiments of the present disclosure.

FIG. 16 depicts a flow chart diagram of an example method to perform according to example embodiments of the present disclosure. Although FIG. 16 depicts steps performed in a particular order for purposes of illustration and discussion, the methods of the present disclosure are not limited to the particularly illustrated order or arrangement. The various steps of the method 1600 can be omitted, rearranged, combined, and/or adapted in various ways without deviating from the scope of the present disclosure.

At 1602, a computing system can obtain input data and a prompt. In some implementations, the input data can include an input image. The prompt can be structured as at least one of a padding variable around the border of the input image, a channel variable for the input image, or a mask variable for the input image.

At 1604, the computing system can process the input data with a machine-learned model to generate a prediction. Additionally and/or alternatively, the input data (e.g., an input image) and the prompt can be processed together with the machine-learned model. The machine-learned model can include a prompt tuning model. In some implementations, the machine-learned model can include a vision model. The vision model can include a convolutional neural network, a ViT model, and/or a vision transformer.

At 1606, the computing system can provide the prediction as an output. The prediction can be a generated classification, a generated image caption, a generated new image, a generated augmented image, text data based on the input image, and/or object detection data. The systems and methods can include providing a prediction as an output. The prediction can be provided to a user computing device. In some implementations, the prediction can be provided as part of a user interface associated with application programming interface provided as part of a prompt model inference service.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:

obtaining, by a computing system comprising one or more processors, an example dataset from a user, wherein the example dataset comprises a plurality of training examples and respective labels;

processing, by the computing system, the example dataset with a machine-learned model to train a first prompt, wherein the first prompt is trained to generate data associated with the example dataset, wherein the first prompt comprises one or more learned parameters representative of a first task;

determining, by the computing system, one or more second prompts are associated with the first prompt, wherein the one or more second prompts comprise one or more pretrained prompts;

generating, by the computing system, a similarity score for each of the one or more second prompts, wherein the similarity scores are determined based on a similarity between the first prompt and the second prompt; and generating, by the computing system, an augmented first prompt with the machine-learned model based at least in part on performing multi-task learning based on the one or more second prompts, wherein generating the augmented first prompt comprises at least one of training or fine-tuning the first prompt on one or more second prompt datasets associated with the one or more second prompts with a highest similarity score.

2. The method of claim 1, wherein determining the one or more second prompts comprises:

performing, by the computing system, a search of a prompt repository to identify similar prompts to the first prompt; and determining, by the computing system, the one or more second prompts based on the search of the prompt repository.

3. The method of claim 1, wherein generating the augmented first prompt comprises:

obtaining, by the computing system, second prompt metadata associated with the one or more second prompts; and processing, by the computing system, the second prompt metadata and the example dataset with the machine-learned model to generate the augmented first prompt.

4. The method of claim 3, wherein the second prompt metadata comprises one or more second prompt datasets associated with the one or more second prompts.

5. The method of claim 1, wherein generating the augmented first prompt comprises multi-task learning based on the one or more second prompts.

6. The method of claim 1, wherein generating the augmented first prompt comprises curriculum learning based at least in part on the one or more second prompts.

7. The method of claim 1, wherein the one or more second prompts are obtained from a plurality of stored prompts stored on a server computing system.

8. The method of claim 1, further comprising:

obtaining, by the computing system, a prompt tuning training application programming interface; and wherein the machine-learned model comprises a prompt tuning model of the prompt tuning training application programming interface.

9. The method of claim 1, wherein determining the one or more second prompts comprises a semantic search comprising at least one of an L2 metric, a cosine metric, or a max product metric.

10. The method of claim 1, wherein the one or more second prompts are determined based on a semantic search of a library of prompts stored with associated metadata for each respective prompt of the library of prompts.

11. The method of claim 10, wherein the associated metadata comprises at least one of a frozen model utilized for training a respective second prompt, a training date for the respective second prompt, or a training dataset for the respective second prompt.

12. A computing system, the system comprising:

one or more processors; and one or more non-transitory computer-readable media that collectively store instructions that, when executed by the one or more processors, cause the computing system to perform operations, the operations comprising:

obtaining a plurality of training datasets;

processing the plurality of training datasets to train a training prompt for each respective dataset, wherein a prompt comprises one or more learned parameters representative of a task;

selecting one or more canonical examples from each of the plurality of training datasets to determine a plurality of canonical examples;

generating an example dataset based on the plurality of canonical examples;

generating a meta-prompt based on the example dataset, wherein the meta-prompt is configured to generate a predicted prompt based on the plurality of canonical examples;

obtaining an aggregated dataset, wherein the aggregated dataset comprises a task description;

processing the task description and the meta-prompt with prompt creation model to generate a task-specific prompt for the task description;

processing the task-specific prompt and the task description with a prediction model to generate a prediction;

evaluating a loss function that evaluates the prediction; and adjusting one or more parameters of the meta-prompt based at least in part on the loss function.

13. The computing system of claim 12, wherein the operations further comprise:

wherein the aggregated dataset comprises an aggregated example and a respective label;

processing the aggregated example and the meta-prompt with the prompt creation model to generate the task-specific prompt for the aggregated example;

processing the task-specific prompt and the aggregated example with the prediction model to generate a second prediction;

evaluating a second loss function that evaluates a difference between the prediction and the respective label; and adjusting the one or more parameters of the meta-prompt based at least in part on the second loss function.

14. The computing system of claim 12, wherein the plurality of training datasets are obtained from a user computing device, and wherein the meta-prompt comprises a user-specific meta-prompt.

15. The computing system of claim 12, wherein selecting the one or more canonical examples from each of the plurality of training datasets comprises determining a specific training dataset from each of the plurality of training datasets based on a dataset-specific prompt generated based at least in part on the specific training dataset and a frozen model.

16. The computing system of claim 12, wherein the operations further comprise:

storing the meta-prompt on a server computing system;

receiving a prompt request from a user computing device;

generating a requested prompt based on the prompt request and the meta-prompt; and sending the requested prompt to the user computing device.

17. One or more non-transitory computer-readable media that collectively store instructions that, when executed by one or more processors, cause a server computing system to perform operations, the operations comprising:

obtaining, via an application programming interface, a training example and a prompt from a user computing device, wherein the training example are associated with the prompt, and wherein the prompt comprises a set of learned parameters that represent a task;

processing the training example and the prompt with a frozen model to generate one or more prompt gradients, wherein the prompt gradient is based at least in part on a prediction generated based on the training example, wherein parameters of the frozen model are held fixed during the training of the prompt, and wherein processing the training example and the prompt with the frozen model to generate the one or more prompt gradients comprises:

a forward pass of the frozen model with the training example and the prompt; and a backwards pass to return the prompt gradients;

sending, via the application programming interface, the one or more prompt gradients to the user computing device for generating an augmented prompt.

* * * * *